(12) United States Patent
Elsaid Ibrahim et al.

(10) Patent No.: US 9,760,821 B2
(45) Date of Patent: Sep. 12, 2017

(54) READER AND TAG

(71) Applicants: Fraunhofer-Gesellschaft zur Foerderung der angewandten Forschung e.V., Munich (DE); Friederich-Alexander-Universitaet Erlangen-Nuernberg, Erlangen (DE)

(72) Inventors: Hazem Elsaid Ibrahim, Erlangen (DE); Hamed Kenawy, Erlangen (DE); Joerg Robert, Uttenreuth (DE); Albert Heuberger, Erlangen (DE); Wolfram Strauss, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/147,236

(22) Filed: May 5, 2016

(65) Prior Publication Data
US 2016/0328638 A1 Nov. 10, 2016

(30) Foreign Application Priority Data
May 7, 2015 (EP) .................................. 15166768

(51) Int. Cl.
*G06K 19/06* (2006.01)
*G06K 19/07* (2006.01)
(Continued)

(52) U.S. Cl.
CPC ....... *G06K 19/0723* (2013.01); *G06K 7/0095* (2013.01); *G06K 7/10029* (2013.01)

(58) Field of Classification Search
USPC .................... 235/492, 451; 370/252; 375/365
See application file for complete search history.

(56) References Cited

U.S. PATENT DOCUMENTS

| 6,150,921 A | 11/2000 | Werb et al. |
| 2012/0033762 A1* | 2/2012 | Tseng ................... H03G 3/3078 375/316 |

(Continued)

OTHER PUBLICATIONS

"EPC Radio-frequency Protocols Class-1 Generation-2 UHF RFID Protocol for Communications at 860 MHz 960 MHz version 1.1.0", Specification for RFID Air Interface, EPC Global Inc., Dec. 17, 2005, 100 pages.

(Continued)

*Primary Examiner* — Ahshik Kim
(74) *Attorney, Agent, or Firm* — Michael A. Glenn; Perkins Coie LLP

(57) ABSTRACT

A reader for wirelessly receiving a signal from a tag, the signal having a portion on a first side, a portion on a second side and a synchronization sequence to be detected between the first and the second side, wherein the portion on the first side, the synchronization sequence and the portion on the second side are serially arranged with each other, has a processor. The processor is configured for storing the received signal, for detecting the synchronization sequence in the received signal, for calculating a transmission characteristic between the tag and the reader, using the portion of the received signal on the first side and for extracting a payload information from the portion of the received signal on the second side, using the calculated transmission characteristic.

23 Claims, 14 Drawing Sheets

(51) Int. Cl.
*G06K 7/10* (2006.01)
*G06K 7/00* (2006.01)

(56) References Cited

U.S. PATENT DOCUMENTS

| | | | | |
|---|---|---|---|---|
| 2012/0155310 A1* | 6/2012 | Kreuzer | .............. | H04W 52/146 370/252 |
| 2014/0269563 A1* | 9/2014 | Wentzloff | ............. | H04L 1/0075 370/329 |
| 2016/0183272 A1* | 6/2016 | Pu | ........................ | H04W 48/16 370/252 |

OTHER PUBLICATIONS

Angerer, C. et al., "Advanced Synchonisation and Decoding in RFID Reader Receivers", IEEE Radio and Wireless Symposium, RWS '09, Jan. 2009, pp. 59-62.

Angerer, C. et al., "RFID Reader Receivers for Physical Layer Collision Recover", Communications, IEEE Transactions on vol. 58, Dec. 2010, pp. 3526-3537.

De Donno, D. et al., "Performance Enhancement of the Rfid EPC Gen2 Protocol by Exploiting Collision Recovery", Progress in Electromagnetics Research B, vol. 43, Aug. 2012, pp. 53-72.

Kaitovic, J. et al., "A Smart Collision Recovery Receiver for Rfids", EURASIP Journal on Embedded Systems, vol. 7, Apr. 30, 2013, pp. 1-19.

Kaitovic, J. et al., "Channel Estimation in Tag Collision Scenarios", RFID, 2012 IEEE International Conference, Apr. 2012, pp. 74-80.

Kaitovic, J. et al., "Rfid Reader with Multi Antenna Physical Layer Collision Recovery Receivers", RFID—Technologies and Applications (RFID-TA), 2011 IEEE International Conference, Sep. 2011, pp. 286-291.

Shen, D. et al., "Separation of Multiple Passive RFID Signals Using Software Defined Radio", IEEE International Conference RFID, Apr. 27-28, 2009, pp. 139-146.

Wang, Yung-Yi et al., "A Baseband Signal Processing Scheme for Joint Data Frame Synchronization and Symbol Decoding for RFID Systems", Eurasip Journal on Advances in Signal Processing, vol. 2010, No. 1, May 31, 2010, pp. 1-11.

\* cited by examiner

FIG. 4

| Sequence # | FMO-Sequence | | | | | | | | | | | | | | |
|---|---|---|---|---|---|---|---|---|---|---|---|---|---|---|---|
| 1 | 1 | -1 | -1 | -1 | 1 | -1 | 1 | 1 | 1 | -1 | 1 | -1 | -1 | -1 | -1 |
| 2 | 1 | -1 | 1 | 1 | -1 | 1 | 1 | 1 | 1 | 1 | 1 | -1 | -1 | -1 | -1 |
| 3 | 1 | -1 | 1 | 1 | 1 | 1 | -1 | 1 | -1 | 1 | 1 | -1 | -1 | -1 | -1 |
| 4 | 1 | 1 | 1 | 1 | 1 | -1 | 1 | 1 | -1 | -1 | 1 | -1 | -1 | -1 | -1 |
| 5 | 1 | 1 | 1 | 1 | -1 | 1 | 1 | -1 | 1 | -1 | -1 | -1 | -1 | -1 | -1 |
| 6 | 1 | 1 | 1 | -1 | 1 | 1 | -1 | 1 | -1 | -1 | -1 | 1 | -1 | -1 | -1 |
| 7 | 1 | 1 | -1 | 1 | 1 | -1 | 1 | -1 | -1 | -1 | 1 | 1 | -1 | -1 | -1 |
| 8 | 1 | -1 | 1 | 1 | -1 | 1 | -1 | -1 | -1 | 1 | 1 | 1 | -1 | -1 | -1 |

46a, 46b, 46c, 46d, 46e, 46f, 46g, 46h $$r_1, r_2, \ldots, r_N = \begin{bmatrix} h_{11} & h_{12} & \cdots & h_{1R} \\ h_{21} & h_{22} & \cdots & h_{2R} \\ \vdots & \vdots & & \vdots \\ h_{N1} & h_{N2} & \cdots & h_{NR} \end{bmatrix}_{H} \cdot \begin{bmatrix} x_1, x_2, \ldots, x_R \end{bmatrix} + \begin{bmatrix} n_1, n_2, \ldots, n_R \end{bmatrix}$$

FIG 12

READER AND TAG

CROSS-REFERENCE TO RELATED APPLICATION

This application claims priority from European Application No. 15166768.0, which was filed on May 7, 2015, and is incorporated herein in its entirety by this reference thereto.

BACKGROUND OF THE INVENTION

The present invention is directed to a reader for wirelessly receiving a signal from a tag and to a tag for wirelessly sending a signal to a reader. The present invention further relates to an efficient collision Recovery based on a modified tag and a modified reader.

In the recent years, the number of applications that use RADIO FREQUENCY IDENTIFICATION SYSTEMS (RFID) has increased, and the reading speed became one of the most critical issues in these applications. Such RFID networks comprise readers (interrogators), which are responsible of scanning the interrogation area and for identifying the tags. The RFID networks further comprise tags (transponders), which store the data to be read by the readers. In RFID systems, the tags are typically share a common communications signal. Thus, there is a certain probability of tag-collisions, i.e., multiple tags answer simultaneously. This collision probability naturally increases in dense networks with many passive tags. Due to the simple design of these passive tags, the reader is responsible for coordinating the network and has to avoid tags collisions using specific anti-collision algorithms. Amongst the RFID networks, attention shall be turned to Ultra High Frequency (UHF) networks which follow EPCGlobal Class 1 Gen 2 standards [1].

According to EPCGlobal Class 1 Gen 2 standards, the conventional anti-collision algorithm is Framed Slotted Aloha (FSA) algorithm which is only a Medium Access Control (MAC) layer protocol. In this algorithm, only the single tag replies (successful slot) are able to be decoded and then identified. Therefore, the conventional definition of the expected reading efficiency $\eta_{conv}=P(1)$, where $P(1)=n/L(1-1/L)^{n-1}$, wherein n presents the number of tags in the reading area and L is the frame length.

In the recent years, some research groups concentrated more to increase the reading efficiency through resolving the collided slots and convert them into successful slots. Shen et al. [2] proposed a collision recovery algorithm for the collided tags based on the signal constellations. However, he focused only on Low Frequency (LF) tags. Christoph Angerer [3], Kaitovic [4] and D. De Donno [5] have focused on the collision recovery of UHF tags. They have used the characteristics of the RFID signals to separate the signals from collisions at the physical layer. However, according to EPCGlobal Class 1 Gen 2 standards, the conventional reader is able to identify a single tag per slot at maximum. Moreover, the biggest problem in their work is the channel estimation mythology for more than two collided tags. Kaitovic [6] and [7] proposed an advanced channel estimation technique for the collided tags using an orthogonal post-preamble.

However, this technique is not compatible with the EPC-Global Class 1 Gen 2 standards, which results to change the old system completely and build up a new standard.

According to EPCGlobal Class 1 Gen 2 standards, first of all, the reader broadcasts the frame size and notifies the beginning of a frame to all tags within a QUERY COMMAND. The frame size may include a number of slots to be used within the frame. After the frame is started, each tag generates a 16-bit random number (RN16) as a temporary ID and selects a slot in the frame. The tags count down the slot counters and back scatter their RN16 as soon as their slot counter is equal to zero. If there is a slot with no tag reply, the reader considers this slot as an empty slot and transmits a QueryRep command to decrement the tags slot counter. If only one tag responds to the slot, the reader transmits an acknowledge (ACK) command with the received RN16. Then, the tag replies with its electronic product code (EPC). If a collision occurs, and as illustrated in FIG. 14, there are two possibilities. First, in systems that have no capability of collision recovery, the reader queries the next slot by sending another QueryRep command.

FIG. 14 schematically illustrates different scenarios according to the known technology. According to scenario a, when the reader is not able to resolve a collision, both colliding signals from the tag comprising a respective RN16 are discarded. According to a scenario b, the reader may be configured for resolving a collision such that the signal 68a may be acknowledged by a respective signal 72 while the signal 68b is discarded. The tag may transmit a signal 74 comprising the EPC. Afterwards, the reader may transmit a query message 76 indicating that the next slot will start afterwards.

The maximum throughput of systems without collision recovery is 36% if the working frame length is equal to the tag population size. In systems that have a collision recovery capability, the reader transmits an ACK command to the tag with the strongest tag reply, i.e., the tag with the highest signal power. In this case, the tag which has the valid RN16 replies its EPC. The remaining tags forget their RN16 and wait for the next frame.

SUMMARY

According to an embodiment, a reader for wirelessly receiving a signal from a tag, the signal having a portion on a first side, a portion on a second side and a synchronization sequence to be detected between the first and the second side, wherein the portion on the first side, the synchronization sequence and the portion on the second side are serially arranged to each other, may have: a processor configured for storing the received signal; for detecting the synchronization sequence in the received signal; for calculating a transmission characteristic between the tag and the reader, using the portion of the received signal on the first side; and for extracting a payload information from the portion of the received signal on the second side, using the calculated transmission characteristic.

According to another embodiment, a tag for wirelessly sending a signal to a reader may have: a processor configured for generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other.

According to another embodiment, a method for wirelessly receiving a signal with a reader from a tag, the signal having a portion on a first side, a portion on a second side and a synchronization sequence to be detected between the first and the second side, wherein the portion on the first side, the synchronization sequence and the portion on the second side are serially arranged to each other, may have the steps of: storing the received signal; detecting the synchronization sequence in the received signal; calculating a transmission characteristic between the tag and the reader, using the portion of the received signal on the first side; and extracting a payload information from the portion of the received signal on the second side, using the calculated transmission characteristic.

According to still another embodiment, a method for wirelessly sending a signal to a reader may have the step of: generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other.

Another embodiment may have a non-transitory storage medium having stored thereon a computer program having a program code for performing, when running on a computer, the method for wirelessly receiving a signal with a reader from a tag, the signal having a portion on a first side, a portion on a second side and a synchronization sequence to be detected between the first and the second side, wherein the portion on the first side, the synchronization sequence and the portion on the second side are serially arranged to each other, the method having: storing the received signal; detecting the synchronization sequence in the received signal; calculating a transmission characteristic between the tag and the reader, using the portion of the received signal on the first side; and extracting a payload information from the portion of the received signal on the second side, using the calculated transmission characteristic, or the method for wirelessly sending a signal to a reader, the method having generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other.

A recognition of the invention consists in having detected that by embedding a synchronization sequence between a first and a second portion of the signal, the reader may first synchronize to the received signal and then calculating a transmission characteristic between the tag sending the signal and the reader using one of the portions of the received signal and for using the determined transmission characteristic for extracting a payload information contained in the other portion of the signal. This allows for separating information used for calculating the transmission characteristic from information containing the payload information. A separation of contents of the message by the synchronization sequence allows for a short synchronization sequence and thus for a high throughput and an efficient communication. Further, by evaluating the transmission characteristic, collided signals may be separated such that a collision recovery is obtained allowing for a high efficiency of the communication.

Embodiments provide a reader for wirelessly receiving a signal from a tag. The signal comprises a portion on a first side, a portion on a second side and a synchronization sequence to be detected between the first and the second side. The portion on the first side, the synchronization sequence and the portion on the second side are serially arranged with each other. The reader comprises a processor. The processor is configured for storing the received signal, for detecting the synchronization sequence in the received signal, for calculating a transmission characteristic between the tag and the reader, using the portion of the received signal on the first side and for extracting a payload information from the portion of the received signal on the second side using the calculated transmission characteristic. An advantage is such that in synchronized communications, such as defined in EPCGlobal Class 1 Gen 2 standards, all signals received from tags may be received at the same time. Thus, also the synchronization sequence may be received at the same time. Based on the transmission characteristic, the payload information may be separated from collided signals.

Further embodiments provide a reader, wherein the processor is configured for separating the signal from the further signal based on a plurality of sets of symbols. An advantage is that by separating signals based on one of the sets of symbols an information may be transmitted based on a relation of a specific set of symbols and a meaning thereof. For example, an operation mode of the tag may be transmitted via the set of symbols.

Further embodiments provide a reader, wherein the processor is configured for calculating the transmission characteristic between each of the tags and the reader and for extracting the payload information from the portion of the signal and of a further signal colliding with the signal, the portions on the second side of the respective signal, using the calculated transmission characteristic. The processor is configured for determining an operation mode of each of the tags based on the portion on the first side of the signal and to determine an order of response signals to be transmitted to the tags based on the determined operation mode. An advantage is such that, based on the determined operation mode, information related to a priority according to which an answer is necessitated may be determined.

Further embodiments provide a reader, wherein the processor is configured for receiving the signal from a tag operating in a first operation mode and a further signal from a further tag operating in a second operation mode, wherein the signal and the further signal comprise the same length. This allows for same length of preambles of the signal and the further signal, i.e., the reader may read and/or communicate with tags operating in different operation modes and/or different preambles.

Further embodiments provide a reader, wherein the processor is configured for sending an operation signal indicating that a tag receiving the operation signal is requested to include a modified transmission information into the signal, the modified transmission information being different from a predetermined transmission information. An advantage is such that the reader may indicate to the tags for switching into a different operation mode, e.g., when determining that collision avoidance or collision recovery may improve communication.

Further embodiments provide a reader, wherein the signal is superimposed by a further signal received from a further tag. The processor is configured for separating the signal and the further signal. The processor is further configured for generating a first response signal containing an information derived from the payload information of the signal and to generate a second response signal containing an information derived from the payload information of the further signal. The reader is configured for transmitting the first and the second response signal sequentially, i.e., one after the other. An advantage is such that signals from different tags may be acknowledged while satisfying requirements of standards, for example one message (signal) per slot.

Further embodiments provide a reader, wherein the processor is configured for determining a first measure related to a signal power of the signal and for determining a second measure related to a signal power of the further signal. The processor is configured for comparing the first measure and the second measure to determine which of the measures is related to a lower signal power when compared to the other measure. The processor is configured for sending the response signal containing the information derived from the payload information of the signal related to the lower signal power before the other response signal. This allows for acknowledging a tag in which the signal is received with a low signal power before acknowledging others, for example to avoid a scenario in which the tag leaves an area of communication before receiving the acknowledgment.

Further embodiments provide a tag for wirelessly sending a signal to a reader. The tag comprises a processor configured for generating the signal using a synchronization information and by arranging the synchronization information between a portion of the signal on a first side of the signal and a portion of the signal at a second side of the signal such that the portion on the first side, the synchronization sequence and the portion on the second side are serially arranged with each other. This may allow for obtaining a signal with an embedded synchronization sequence.

Further embodiments provide a tag, wherein the processor is configured for selecting a modified transmission information from a plurality of modified transmission information and to include the selected modified transmission information into the portion on the first side. Selecting a modified transmission information may allow for transmitting further information with the transmission information while enabling a reader to perform collision recovery based on the transmission information simultaneously.

Further examples provide a tag, wherein the tag is configured for receiving an operation signal from the reader, wherein the processor is configured to include a predetermined transmission information into the signal before receiving the operation signal and to include the modified transmission information being different from the predetermined transmission information into the portion on the first side after receiving the predetermined transmission information. This may allow for a tag switching its operation mode based on a signal received from the reader and for indicating the changed operation mode to the reader by changing the specific transmission information, wherein the transmission information is still suitable for determining the transmission characteristic at the reader.

Further embodiments provide a tag, wherein the processor is configured for generating and storing a temporary variable and to include the temporary variable as a payload information into a signal to be sent to the reader. The processor is configured to keep the temporary variable stored if a signal received from the reader contains a payload information different from the temporary variable or an information derived thereof. A signal expected to be received from the reader is expected to contain the temporary variable or the information derived thereof. This allows for keeping the temporary variable even if a signal is received that may be directed to a different tag, such as an ACK such that the tag may be acknowledged by a further signal received sequentially to the signal directed to the further tag.

Further embodiments relate to a method for wirelessly receiving a signal from a tag, to a method for wirelessly sending a signal to a reader and to a computer program.

BRIEF DESCRIPTION OF THE DRAWINGS

Embodiments of the present invention are described herein making reference to the appended drawings, in which:

FIG. 4 illustrates a table comparing a multitude of sequences which may be contained in the received signal, according to an embodiment;

FIG. 12 schematically illustrates a concept of determining or calculating the transmission characteristic between a plurality of tags and a number of receiving antennas of the reader, according to an embodiment;

DETAILED DESCRIPTION OF THE INVENTION

Figure 1:
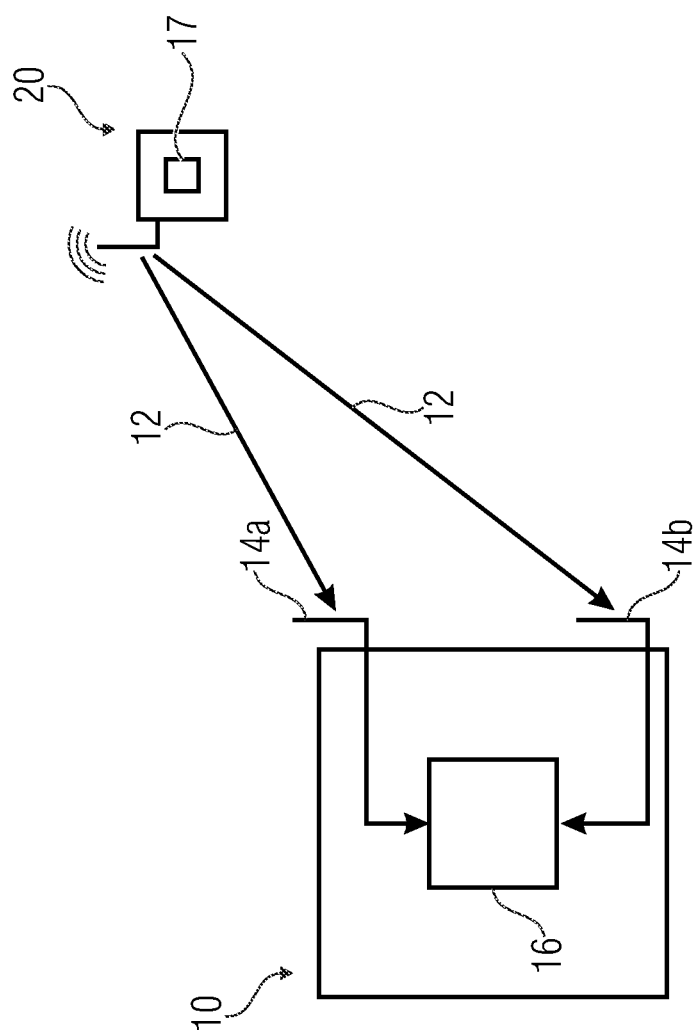
FIG. 1 schematically illustrates a communication system comprising a reader and a tag, according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference will be made to readers and tags. Tags may be referred to as conventional tags, wherein this may be understood as operating as defined in the EPCGlobal standard 1 Gen 2. An enhanced tag or a tag operating in an enhanced operation mode may be understood as comprising additional functionality according to the teachings disclosed herein. A conventional reader may refer to a reader operating according to the EPCGlobal standard 1 Gen 2.

FIG. 1 schematically illustrates a communication system 100 comprising a reader 10 and a tag 20. The reader 10 and the tag 20 may form an RFID communications system, i.e., the reader 10 may be an RFID reader and/or the tag 20 may be an RFID tag.

The reader 10 may be configured to receive a signal 12 from the tag 20 with antennas 14a-b. An RFID reader may comprise one or more antennas 14a-b for receiving the signal 12, for example 2, 4 or more. Characteristics of the signal 12 may vary at each antenna. The characteristic may be, for example, a phase and/or an amplitude of the signal 12. Between each of the antennas 14a-b and the tag 20 a transmission characteristic may be determined.

Based on the transmission characteristic a separation of colliding signals from different tags may be performed.

The reader 10 comprises a processor 16. The processor 16 is configured for storing the received signal 12 and for detecting at least a position of a synchronization sequence contained in the received signal 12. As will be described later, the signal 12 may comprise the synchronization sequence to be detected between a portion of the signal 12 arranged on a first side and a portion of the signal 12 arranged at a second side of the signal 12. The portion of the first side, the synchronization sequence and the portion on the second side may be serially arranged with each other, i.e., the synchronization sequence may be embedded between the portion on the first side and the portion on the second side.

The processor 16 may be configured for calculating a transmission characteristic between the tag 20 and the reader 10 (e.g., between the tag and each of the antennas 14a-b), using the portion of the received signal on the first side. The portion on the first side may be a portion of the signal 12 received before or after the synchronization sequence. The portion on the second side may be a portion of the signal 12 received after or before the synchronization sequence, different from the portion on the first side. The transmission characteristic may refer, for example, to a channel estimation performed by the processor 16 to determine channels between the tag 20 and one, more or all of the antennas 14a-b so as to enhance reception of the signal 12 and/or to allow for a collision recovery, for example, when signal are received from two or more tags at the same time.

The processor 16 may be configured for extracting a payload information from the portion of the received signal 12 on the second side using the calculated transmission characteristic.

The tag 20 comprises a processor 17 configured for generating and sending the signal 12.

Figure 2:
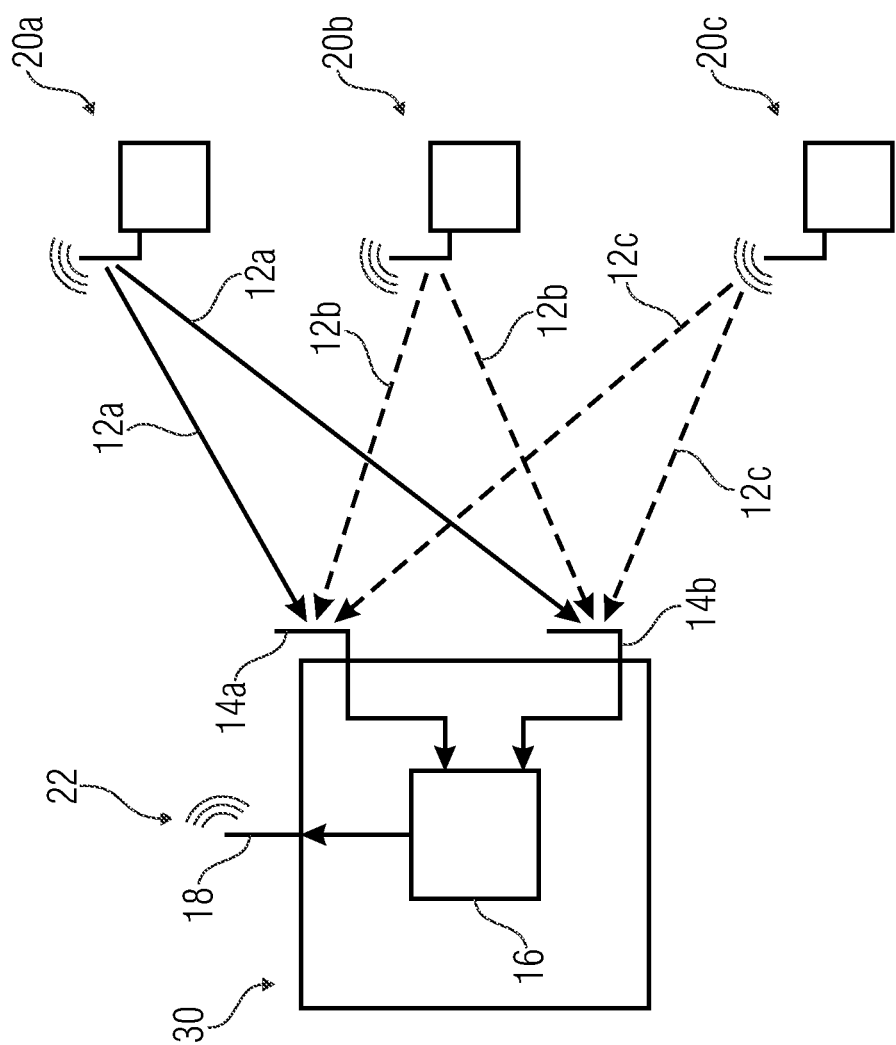
FIG. 2 illustrates a schematic block diagram of a communication system comprising a reader and a plurality of tags, according to an embodiment.

FIG. 2 illustrates a schematic block diagram of a communication system 200 comprising a reader 30 and a plurality of tags 20a-c. The reader 30 comprises an antenna 18 configured for transmitting a signal 22 to the tags 20a-c. The signal 22 may be an electromagnetic field modulated by the reader 30 and/or by one or more of the tags 20a-c for transmitting signals. In wireless communication systems, for example in RFID communication systems, there may occur scenarios in which the tags 20a-c at least partially try to transmit their respective signals 12a-c to the reader 30 at a same time and/or during a same time interval. This may also be referred to as colliding signals 12a-c. During a time interval during which two or more tags 20a-c try to transmit their respective signals 12a-c, a superimposed signal may be obtained which is received by the reader 30. The processor 16 may be configured for calculating the transmission characteristic between each of the tags 20a-c and the reader 30 and/or between each of the tags 20a-c and each of the antennas 14a-b. Based on the determined or calculated transmission characteristic, the processor may be configured for separating the signals 12a-c and for extracting payload information from the signals 12a-c. Thus, although the signals 12a-c may collide, the reader 30 may be configured for separating each of the signals 12a-c and/or to send a signal 22 generated by the processor 16 to the tags 20a-c.

In the following, reference will be made to the signal 12, to its structure and to advantages that may be obtained when utilizing the signal 12.

Figure 3:
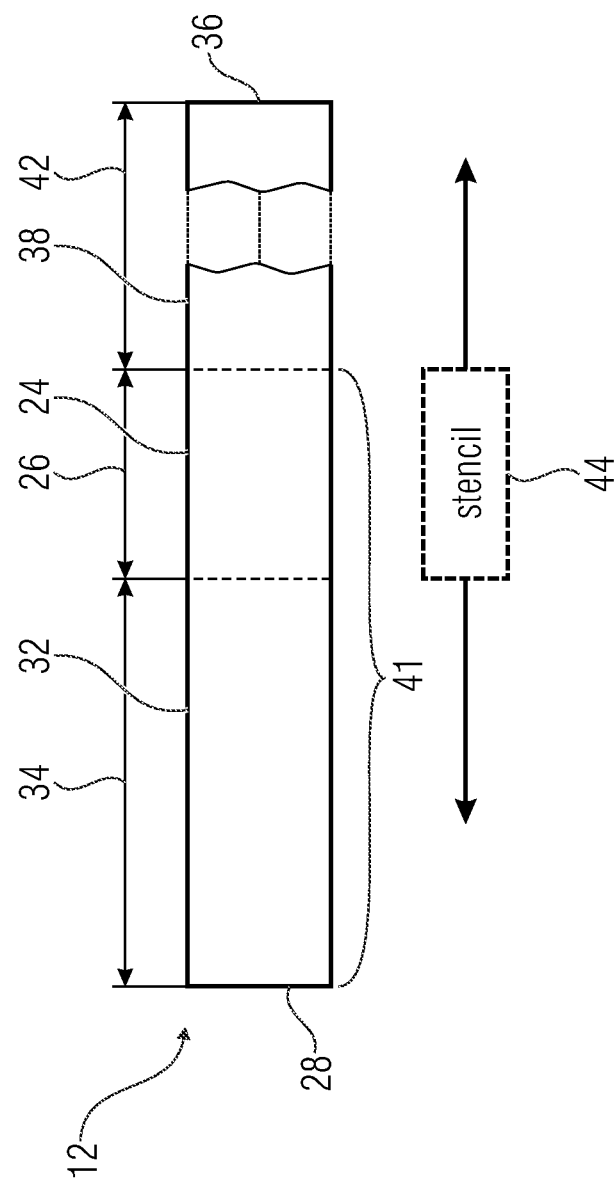
FIG. 3 shows a schematic diagram illustrating the structure a signal received by the reader, according to an embodiment.

FIG. 3 shows a schematic diagram illustrating the structure of the received signal 12. The signal 12 comprises a synchronization sequence 24 comprising a length 26. The signal 12 comprises a first side 28, e.g., a beginning or an end of the signal 12. Beginning and end may refer to a first bit or time instance, to a last bit or time instance of the signal 12 respectively. A portion 32 of the signal 12 on a first side of the signal 12 may be arranged between the first side 28 and the synchronization sequence 24. The portion 32 on the first side 28 may comprise a length 34.

A second side 36 of the signal 12 may be complementary to the first side 28, i.e., the end or the beginning of the signal 12. Between the second side 36 and the synchronization sequence 24 a portion 38 on the second side 36 may be arranged comprising a length 42. The portion 32 on the first side 28, the synchronization sequence 24 and the portion 38 on the second side 36 may be arranged serially with respect to each other, i.e., they may be sent and/or transmitted one after the other.

Although depicted as comprising only the portion 32, the synchronization sequence 24 and the portion 38, the signal 12 may comprise further information, portions and/or bits being arranged between the side 28 and the portion 32, between the portion 32 and the synchronization sequence 24, between the synchronization sequence 24 and the portion 38 and/or between the portion 38 and the second side 36.

The processor of the reader may be configured for scanning the received signal 12 for the synchronization sequence 24. The processor of the reader may be configured for applying a matching filter, i.e., a stencil 44, to the signal 12, searching for the synchronization sequence 24.

After having detected the synchronization sequence 24, the processor may determine a position and/or a content of the portion 32 and/or of the portion 38 based on a known structure of the signal 12. The stencil 44 may comprise a length, i.e., an amount of bits to be compared, that is equal to the length 26. Alternatively, the stencil 44 may comprise a length that is shorter or longer. For example, the length of the stencil 44 may be longer, when compared to the length 26, when a part of a content of the portion 32 is known. The known content may be arranged, for example, adjacent to the synchronization sequence 24 and/or may be filtered using the stencil 44. Although depicted as being configured for matching a successive number of bits, the stencil 44 may be configured for matching two or more groups of bits separated from each other.

For example, an expected message 41 comprising or consisting of the portion 32 and the synchronization sequence 24 may be a preamble of a message. For example, the expected message 41 may be a preamble of a signal according to the EPCGlobal standard 1 Gen 2, wherein the synchronization sequence 24 may be the short version and wherein the portion 32 may comprise a length equal to the 12 bit pilot zone (extended preamble). The transmission information may be contained in the portion 32, which may be referred to as a preamble of the expected message 41. For example, the transmission information may be arranged in the portion 32. The transmission information may comprise a length that is shorter than or equal to the length 34. When the length of the transmission information is shorter than the length 34, then the transmission information may be arranged at the first side 28, i.e. the portion 32 may comprise a predefined structure adjacent to the synchronization structure 24. Alternatively, the transmission information may be arranged adjacent to (before) the synchronization sequence 24, i.e., the portion 32 may comprise the predefined structure at the first side 28. The predetermined structure may be, for example, all bits are zeros. This may allow for a larger size of the stencil 44 and/or a larger size of the effective synchronization sequence (synchronization sequence 24 and additional zeros). Alternatively, the predetermined structure may be arranged at the beginning of the signal, i.e., as a pilot tone.

The stencil 44 may be referred to as a processor of the reader configured for comparing the received signal with a predetermined information to obtain a result of the comparison and for detecting a position of the synchronization sequence 24 based on the result. At least a first bit may be arranged between the synchronization sequence 24 and a beginning of the received signal, i.e. the first side 28. The processor of the reader may be configured for calculating the transmission characteristic using the at least one bit of the portion 32.

FIG. 4 illustrates a table comparing an exemplary multitude of sequences 46a-h. The processor of the reader may be configured for determining the sequences 46a-h as transmission information contained in the portion on the first side of the signal received from a tag. The processor of the tag may be configured for randomly selecting one of the sequences 46a-h and for including them into the portion on the first side or the portion on the second side of the signal.

Each of the sequences 46a-h may be understood as a set of symbols, the sequences 46a-h forming a plurality or multitude of sets of symbols. For example, one of the sequences may be arranged in one of the portions on the first or second side. The processor of the reader may be configured for determining, if one or which one of the sequences 46a-h is contained in the signal, even if the signal is superimposed (colliding) with other signals.

The sequences 46a-h are depicted as a so-called FMO-sequences. One bit of information may be expressed as two subsequent states in the FMO-sequence. For example, two subsequent FMO-sequence states being different from each other, such as 1/−1 or −1/1 may represent a bit of information being zero. To subsequent states of the FMO-sequence being equal to each other, i.e., 1/1 or −1/−1 may represent a bit of information that is equal to 1.

The processor of the reader may be configured for extracting one of the transmission information sequences 46a-h out of the portion on the first side of the signal. The sequences 46a-h may comprise a high or maximum distance with respect to each other in a symbol space. Simplified, the sequences 46a-h may be referred to as orthogonal sequences. The processor of the reader may be configured for separating colliding signals, i.e., to differ one from the other, by examining the colliding signals with respect to different sequences 46a-h. The processor of the reader may be configured for examining the signals by multiplying the corresponding bits or FMO-states of the signal that are supposed to contain one of the sequences 46a-h with the sequences 46a-h. The processor of the reader may be configured for using the obtained result for extracting the payload information. Thus, for example, a number of up to 8 colliding signals, each colliding signal comprising a different sequence 46a-h, may be separated and evaluated separately by the processor of the reader.

The sequence 46a may be represented by eight zeros. Thus, the sequence 46a may be included into a pilot tone of the EPCGlobal standard 1 Gen 2 standard or may be a part of it. Using a different sequence 46b-h may lead to a different signal comprising the same length. The different signals and/or different sequences 46b-h may indicate for a different operation mode of the tag when compared to the operation defined in the EPCGlobal standard 1 Gen 2 standard.

Although the sequences 46a-h are depicted as comprising 8 bits of information, represented as 16 states in the FMO-representation, a different number of sequences may be used as the plurality of sets of symbols. Alternatively or in addition, the sequences 46a-h and/or different sequences may comprise a different length of bits. Simplified, the sequences 46a-h may comprise a length of b bits. For example, the sequences 46a-h may comprise a length that is at least 1 bit and at most 100 bits, advantageously at least two bits and at most 12 bits and more advantageously at least 7 bits and at most 9 bits.

Figure 5:
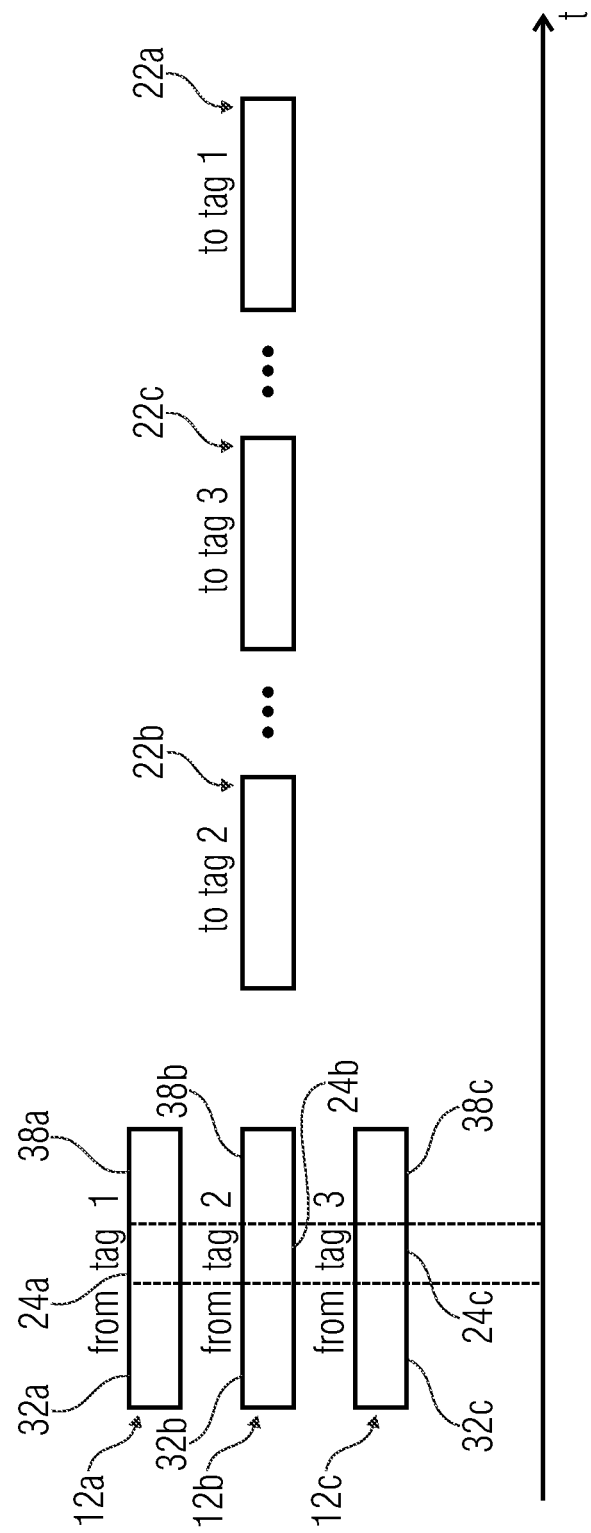
FIG. 5 shows a schematic timeline illustrating a scenario in which a reader receives three signals from three different tags, according to an embodiment.

FIG. 5 shows a schematic timeline illustrating a scenario in which a reader receives three signals 12a-c from three different tags. The signals 12a-c may be received simultaneously, i.e., the synchronization sequences 24a-c being equal to each other may be received at the same time or during a same time interval. Simplified, the signals 12a-c may collide in a synchronized communication, i.e., tags start to send the signals 12a-c simultaneously. Same or equal synchronization sequences may allow for preventing the synchronization sequences 24a-c from falsifying each other when colliding. The reader may separate the signals 12a-c and may extract payload information contained in the portions 38a-c on the second side of the signal.

The reader, the processor thereof respectively, may generate signals 22a-c directed to the tags that have sent the signals 12a-c. For example, the processor of the reader may be configured to generate a signal 22a based on the payload information contained in the portion 38. The processor of the reader may be configured for generating the signal 22b based on the payload information contained in the portion 38b and for generating the signal 22c based on the payload information contained in the portion 38c. The information included in the signals 22a-c may be, for example, the RN16 received as payload information in the signals 12a-c or information derived thereof. The signals 22a-c may be, for example ACK signals, a Query or QueryRep signal or the like in accordance with the EPCGlobal Class 1 Gen 2 standard.

The reader may be configured for sending the signals 22a-c successively, one after the other, wherein one signal may directly follow a previous signal. Alternatively, a different signal may be transmitted therebetween. Simplified, the reader may be configured for acknowledging different tags by sequentially transmitting acknowledge signals to the tags.

The processor of the reader may be configured for determining an order of the signals 22a-c. The processor may be configured for implementing the order based on one or more criteria. A first criterion for determining the order may be, for example, a measure related to a signal power of a signal 12a-c when received at the reader. Alternatively or in addition, a second criterion may be an operation mode of one or more tags sending the signals 12a-c. An information indicating an operation mode in which the tag sending a signal 12*a-c* is operating may be contained in the portion 32*a-c*. For example, a first operation mode may be referred to as baseline operation mode and may be in accordance with the EPCGlobal Class 1 Gen 2 standards. A second operation mode may indicate an enhanced functionality of the tag. The processor of the reader may be configured for determining the operation mode of the tag based on the structure of the sequence 46*a-h* contained in the signal, e.g., all zeros or not.

The enhanced functionality may comprise an ability of the tag for storing a temporary variable such as the RN16 even if a different tag is acknowledged by the reader. For example, the reader may be configured for first transmitting an ACK signal (signal 22*b*), which is containing an information derived from a signal 12*b* by which the respective tag 20*b* indicates the baseline operation mode. The tag 20*b* may therefore indicate to forget or delete the RN16 value in case a different acknowledge is received as defined in EPCGlobal Class 1 Gen 2 standard. Afterwards, signals 22*a* and 22*c* for acknowledging tags 20*a* and 20*c* indicating to operate in the enhanced operation mode may be sent.

The processor of the reader may be configured for determining a measure related to a signal power of the signals 12*a-c* and for comparing the determined measures. The processor may be configured for determining an order of the messages 22*a-c* at least partially corresponding to a rule similar to "from lowest signal power to strongest signal power". I.e., the processor may be configured for acknowledging the weakest signal first. The processor of the reader may be configured for implementing a plurality of criteria and/or a combination thereof for determining the order, e.g., at least one tag operating in the base line mode first, tags operating in the enhanced mode from weakest to strongest signal strength. With both rules (baseline operation mode first and weakest tag first) implemented, the latter may be applied to the tags operating in the enhanced operation mode and/or to the tags operating as baseline tags separately or commonly. Thus, the processor of the reader may be configured for comparing the measures related to the signal powers of the signals 12*a-c* and to determine which of the measures is related to a lower signal power when compared to at least another measure and for sending the response signal 22*a-c* containing the information derived from the payload information of the signal 12*a-c* related to the lower signal power before sending the other response signal 22*a-c*.

As explained with reference to FIG. 4, the operation mode may be indicated via a sequence 46*b-h* different from the sequence 46*a*. For example, a baseline tag may indicate its operation mode by using the sequence 46*a*. A tag capable of operating as enhanced tag may be configured for inserting one of the references 46*b-h*, for example, after having received a request to do so. A length of bits of the signals 12*a-c* may be equal even when comprising different sequences 46*a-h* and/or when indicating different operation modes. Based on the (orthogonal) sequences 46*a-h*, the processor of the reader may be configured for separating the colliding signals 12*a-c* and for determining an operation mode of the tag.

Figure 6:
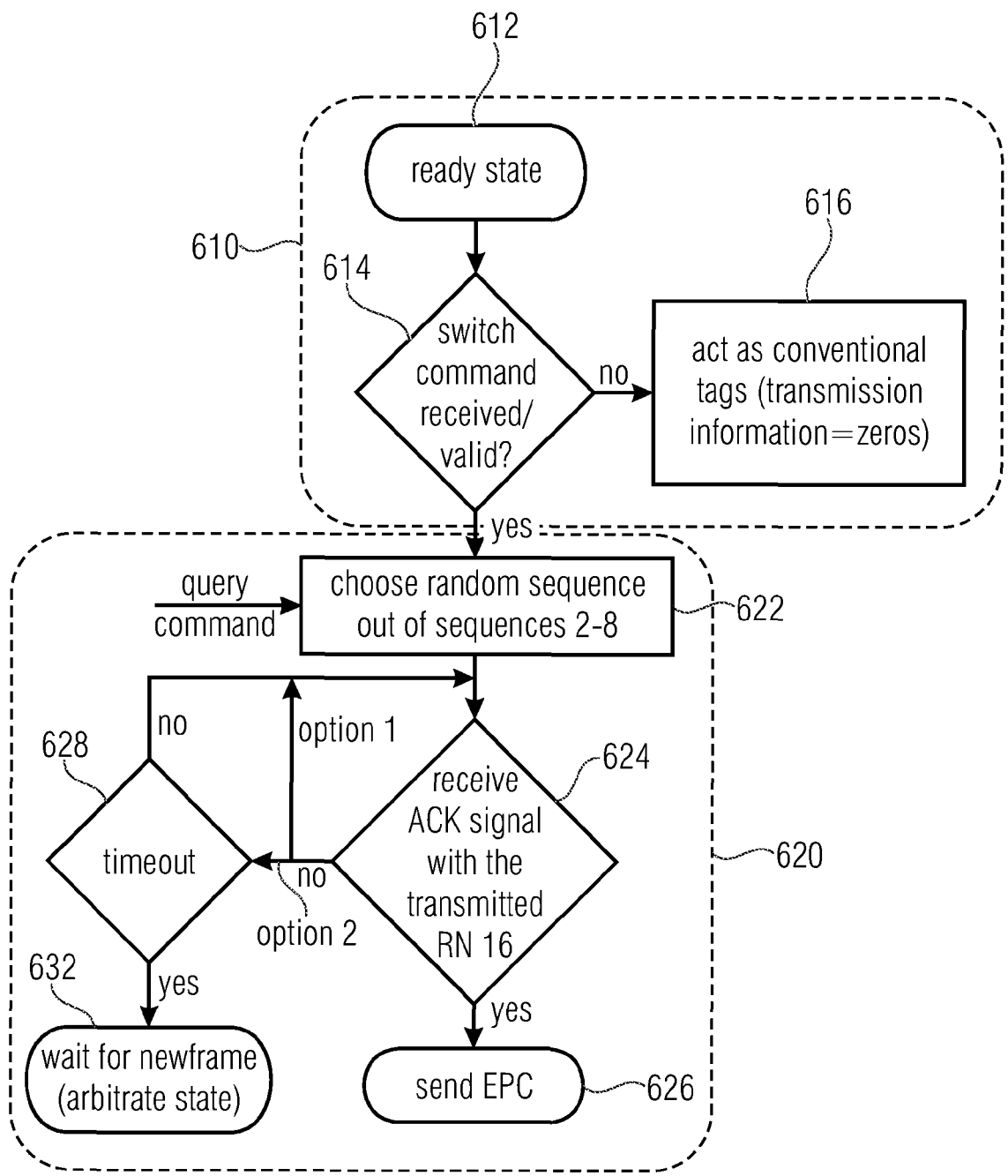
FIG. 6 shows a schematic flowchart illustrating an operation of a tag, according to an embodiment.

FIG. 6 shows a schematic flowchart illustrating an operation of a tag such as the tag 20, comprising a combination of the baseline operation mode 610 and an enhanced operation mode 620. The baseline operation mode 610 may be in accordance with the EPCGlobal Class 1 Gen 2 standard. In a so-called ready state 612, a tag awaits a query command or a different message from a reader. In 614 an operation signal may be received from the reader which may be referred to as switch command. The reader may be configured for transmitting the operation signal indicating that the reader requests a switch of the tag to the enhanced operation mode. For example, this may be one of a plurality of commands reserved for further use in EPCGlobal Class 1 Gen 2 standard. This may allow for a tag according to the teachings disclosed herein to switch to the enhanced operation mode 620 while other tags in accordance with the EPCGlobal Class 1 Gen 2 may ignore the unknown operation signal (switch command) and continue to operate in the baseline operation mode, i.e., to act as conventional tag 616.

The enhanced operation mode 620 illustrated may refer at least partially to a scenario in which the tag received a query command, i.e., a signal 12 from the reader. At 622, the processor of the tag may be configured for selecting one of the sequences 1-8 depicted in FIG. 4. Alternatively, the processor may be configured for only selecting a sequence indicating an operation mode, e.g., one of the sequences 2-8. This may allow for a unique determination of the operation mode of the tag based on the sequence contained in the signal.

Thus, the tag may be configured for receiving an operation signal (switch command) from the reader. The processor may be configured for including a predetermined transmission information, e.g., sequence 46*a* into the portion on the first side before receiving the operation message. The processor may be configured for including the modified transmission information (one of the sequences 46*a-h*) Alternatively, the processor may be configured for including one of the sequences 46*b-h* being different from the predetermined transmission information as modified transmission information into the portion on the first side after receiving the operation signal.

The processor of the tag may be configured for selecting the sequence randomly from the sequences 1-8. Alternatively, the processor of the tag may be configured for selecting the sequence randomly from the sequences 2-8. The processor of the tag may be configured for generating a signal such as the signal 12 containing the selected sequence using the synchronization information (selected sequence). The processor of the tag may further be configured for arranging the synchronization sequence between the portion of the signal on the first side of the signal and the portion of the signal on the second side of the signal. The processor of the tag may be configured for including the selected sequence into the portion on the first side of the signal. The processor of the tag may be configured for sending the signal in 622 and for awaiting a response signal such as an ACK from the reader. The response may be expected to contain the temporary variable (RN16) or an information derived thereof.

The processor of the tag may be configured for receiving such a signal, referred to as ACK signal in 624 and for evaluating the payload information contained in the received ACK signal. The ACK signal may be in accordance with the EPCGlobal Class 1 Gen 2 standard.

The processor may be configured for generating a signal containing a further information such as the electronic product code (EPC) when the signal received in 624 contains the expected temporary variable in 626.

When the signal received in 624 comprises a different information, for example a different temporary variable, the processor of the tag may be configured to either remain in 624 and to await the next response signal, to compare the next response signal with the stored temporary variable and to transmit the EPC in 626 when the following response signal contains the stored temporary variable. As an another option, when a first or previous response signal comprises the variable different from the stored and/or expected temporary variable, the processor may be configured for determining if a timeout has occurred in 628. The processor may be configured for returning to 624 when the timeout has not occurred and for switching to an arbitrate state 632 when the timeout has occurred. Alternatively, the processor of the tag may be configured for determining, if a timeout has occurred while awaiting a signal. When a signal different from the ACK signal is received, then the timeout may be restarted.

Figure 7:
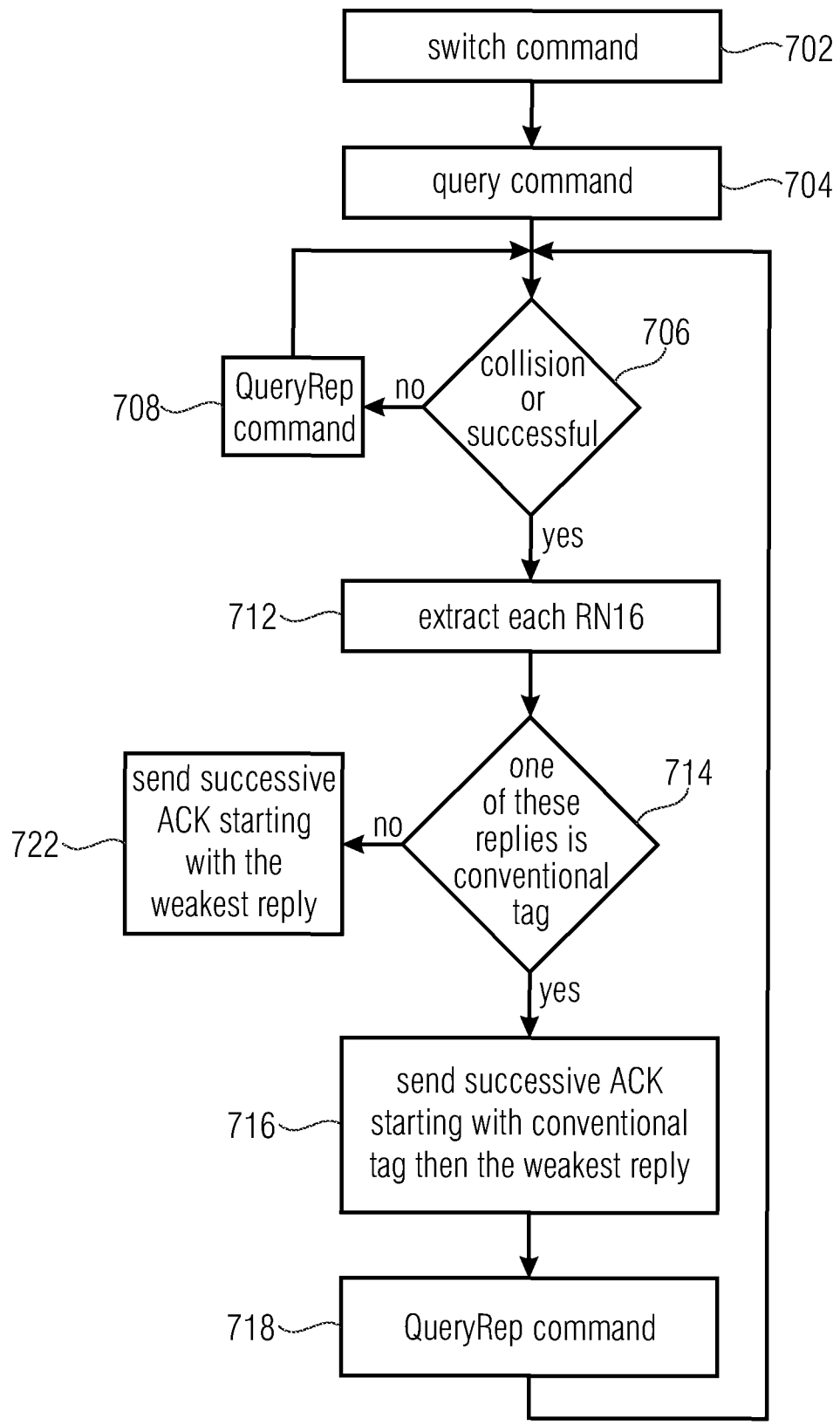
FIG. 7 shows a schematic flowchart of an operation of a reader, according to an embodiment.

FIG. 7 shows a schematic flowchart of an operation of a reader, e.g., the reader 10 or 30. The illustrated operation may be compatible and/or complementary with the operation of the tag illustrated in FIG. 6. The processor of the reader may be configured for transmitting the switch command in 702. The switch command may be received by a tag in 614. Afterwards, the reader may be configured for transmitting a so-called query command which the tag may receive in 622.

One or more signals 12*a-c* may be received in 706. If only one signal is received, the state may be referred to as successful. If at least two signals are received, a collision occurs. If no signal is received during the slot command, the processor of the reader may be configured for transmitting a so-called QueryRep command according to the EPCGlobal Class 1 Gen 2 in 708. If the slot was successful or if a collision has occurred, the processor may be configured for extracting the payload information (RN16) from each of the separated signals in 712.

The processor of the reader may be configured for determining an operation mode of the tags transmitted in the signals received in 706, for example, based on the contained sequence 46*a-h*. The processor may determine that one of the replies is transmitted by a conventional tag, i.e. a baseline tag in 714. When one or more of the tags is determined to operate as a conventional tag, the processor may be configured for determining an order of acknowledge signals 22*a-c* such that the conventional tag is acknowledged first. The remaining, enhanced tags may be acknowledged according to a further order or criterion, e.g., that the weakest tag is replied first and following other (increasing) determined signal strengths. After the acknowledge signals are sent, the processor may be configured for generating and sending a QueryRep command in 718 and for returning into the state 706.

The processor may be configured for sending the acknowledge signals according to an order of increasing strength of the signal power and/or the determined measures related thereto in a state 722. The signal power or determined measure related thereto may refer to the signal received from the tags before. The processor may be configured for switch to the state 722 when none of the tags that have replied are determined to operate as a conventional tag.

By replying to conventional tags first, operation according or at least compatible to the EPCGlobal Class 1 Gen 2 may be performed, as those conventional tags may be configured to forget their RN16 when an acknowledge is received comprising a different RN16 of a different tag. Tags capable of storing (remembering) their RN16 according to the enhanced operation mode and as described with respect to the state 624, may be acknowledged afterwards sequentially (successively). This may allow for obtaining a higher throughput of the communications system. Thus, during one slot a high number of tags may be acknowledged. This may allow for a high throughput of the communication system. Based on the different sequences, a high number of colliding signals from different tags may be separated and processed to further increase the throughput of the communications system. An advantage is, that the reader may determine a slot to end by its QueryRep signal. Before sending this signal, the reader may send a plurality of signals or messages. The slot used in this manner may be considered as pseudo parallel.

The processor of the tag may be configured for generating and storing a temporary variable such as the RN16 and to include the temporary variable as a payload information into the signal to be sent to the reader. The processor may be configured for keeping (storing) the temporary variable if a signal received from the reader contains a payload information different from the temporary variable or an information derived thereof, if the signal is expected to contain the temporary variable or the information derived thereof, e.g. according to the acknowledge procedure in the EPCGlobal Class 1 Gen 2.

Figure 8:
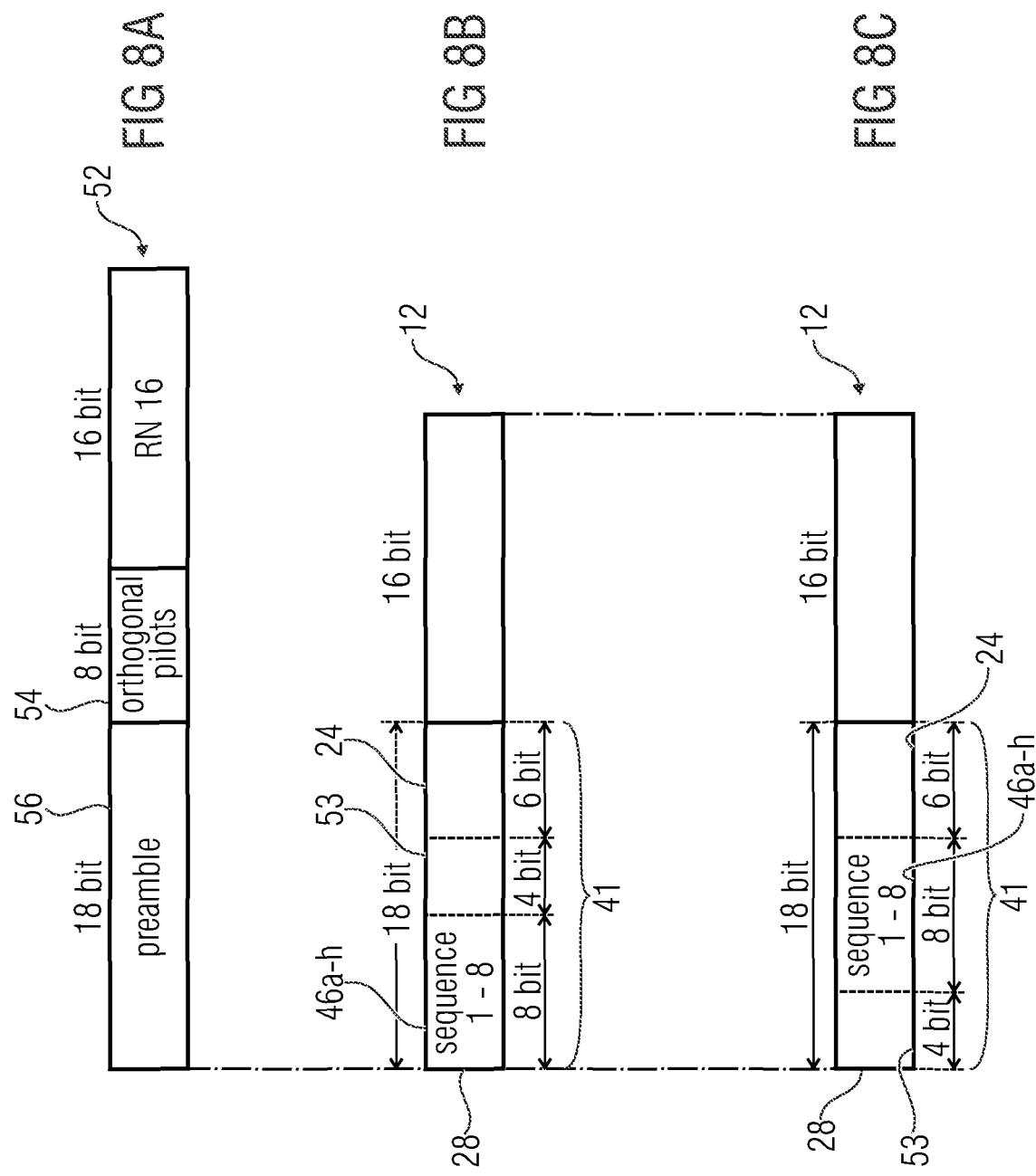
FIGS. 8a-c schematically illustrate a comparison between received signals according to embodiments and a signal according to the known technology.

FIGS. 8*a-c* schematically illustrates a comparison between signals 12 illustrated in FIG. 8*b* and FIG. 8*c* and a signal 52 proposed in [6] illustrated in FIG. 8*a*. In [6], it is proposed to insert a portion 54 comprising orthogonal pilots having a length of 8 bit between a preamble 56 and the RN16 of a conventional signal. The conventional signal may be in accordance with the EPCGlobal Class 1 Gen 2. By inserting the portion 54, a length of the signal 52 is obtained, the length being not in accordance with the standard, such that readers and/or tags operating according to the standard will be unable to use the signal 52. According to the teachings disclosed herein and as illustrated in FIGS. 8*b-c*, the signal 12 may have a total length 34 of bits which may be in accordance with the standard. One of the sequences 46*a-h* may be a part of the pilot tone comprising only zeros and as defined in the standard. This may apply for sequences 46*a-h* comprising a length of at most 12 bits and at least one bit.

The expected message 41 may comprise a portion 53 comprising a first number of bits (a number of a bits). The portion 53 may comprise the predetermined structure and may be arranged at a remaining portion of the expected message unoccupied by the synchronization sequence 24 and by the transmission information 46*a-h*. For example and as illustrated in FIG. 8*b*, the transmission information may comprise a number of b bits and may be arranged at the first side 28. The variables a and b may be summed up to a fixed value, e.g., 12 bits. The portion 53 may be arranged adjacent to the synchronization sequence. Based on the predetermined structure, the portion 53 may be referred to as "first" synchronization sequence being arranged before (preceding in time) the (second or extra) synchronization sequence 24.

The signal 12 may comprise a dynamic structure when regarding the expected message 41, i.e., the structure (such as the number of a bits and/or the number of b bits) may vary from system to system and/or over time. The portion 53 comprising the number of a bits may be used for synchronization. The transmission information comprising a number of b bits may be used for channel estimation. In other words, the distribution of the orthogonal sequences 46*a-h* and the preceding or successive zeros is not fixed. The sequences 46*a-h* may comprise values with 8 bits, the predetermined structure may comprise 4 bits. The sequences and the predetermined structure may comprise a different amount of bits. A condition may be, that the summation of both number of bits is a fixed value, e.g., 12 bits. One possible structure of the portion on the first side may be all zeros, e.g., sequence 46*a* combined with a predetermined structure comprising zeros. I.e., one of the possible values of the 12 bits is all zeros.

Being arranged adjacent to each other and as illustrated in FIG. 8*b*, the synchronization sequences 53 and 24 may comprise a size that is greater when compared to a size of the synchronization sequence 24, thus synchronization may be performed more precisely.

Being arranged separated from each other by the transmission information and as illustrated in FIG. 8c, the portion 53 may allow for a first synchronization, wherein the synchronization sequence 24 may allow for an additional synchronization. This may allow for a precise determination of a position of the transmission information, i.e., the sequence 46a-h. Alternatively, the portion 53 may be arranged partially between the first side and the transmission information and partially between the transmission information and the synchronization sequence 24. As illustrated in FIG. 8c, the processor may be configured for arranging the modified transmission information 46a-h adjacent to the synchronization sequence 24 in the portion on the first side. The processor may be configured for arranging the portion 53 comprising a predetermined structure between the first side 28 and the modified transmission information 46a-h.

Simplified, according to the teachings disclosed herein, the tag 20 may be configured for communicating with a conventional reader as this reader may be unable to send the above described operation signal (switch command). A reader being configured for sending the switch command may be configured for communicating with conventional tags according to the standard and with tags operating in the enhanced operation mode, for example when the reader acknowledges conventional tags first. Simplified, the reader and the tag according to the teachings disclosed herein may be operated in accordance with the standard and may be denoted as backwards compatible.

The processor may be configured for generating the synchronization sequence 24 comprising a length of six bits, for generating the portion on the second side of the signal 12 comprising a length of 16 bits and for generating the portion on the first side of the signal 12 (e.g., as part of the expected message 41), comprising a length of 12 bits. The processor may be configured to include a transmission information comprising a length of 8 bits as preamble, i.e., first bits, of the portion on the first side. Alternatively, the processor may be configured to include the transmission information between a first synchronization sequence (number of a bits of portion 53) and a second synchronization sequence (the sequence 24).

In other words, a system comprising a reader and one or more tags according to the teachings disclosed herein may be configured for identifying multiple tags per slot, which may increase the reading efficiency significantly. Moreover, the communication systems may be compatible with the EPCGlobal Class 1 Gen 2 standard, i.e. the tag may be identified by the conventional reader without affecting the performance and wherein the conventional tag may also be identified be identified by a reader according to the teachings disclosed herein.

A modified tag, such as the tag 20, may comprise at least partially the same hardware as a conventional UHF EPC-Global Class 1 Gen 2 tag. The tag may act exactly like the conventional tags by default. However, they may act different when they receive a special command such as the switch command (operation signal) from a reader. According to EPCGlobal Class 1 Gen 2 standard, the conventional tags may generate a constant preamble for the RN16 packet, either as a short version (6 bits preamble) or as a longer version (18 bits comprising 12 bits zeros as a pilot and 6 bits of the short version). The processor of the tag 20 may be configured for using the preamble comprising a length of 18 bits but with eight different structures. The structure of the described preamble may comprise a length of 8 bits, the sequences 46a-h, four additional zeros and 6 bits of the short version preamble.

One change described herein may be seen in the 8 bits orthogonal pilots. They may comprise a large or maximum distance in the signal space, i.e., sequences different from only zeros may be orthogonal to each other and also orthogonal to the conventional pattern (8 bits zeros). I.e., the processor may be configured for inserting at least one of a multitude of different sets of information, i.e., one of the sequences 46a-h. At least one modified transmission information (46b-h) of the sets of information is different from the predetermined transmission information (46a) and wherein the multitude of sets of information may comprise the predetermined transmission information.

The sequences described in [6] are described to enhance the channel estimation. Thus, the first portion of the signal is used for synchronization. In a known concept the sequences are used as a post preamble which is not compatible with the EPCGlobal Class 1 Gen 2 standards. According to the teachings disclosed herein, these sequences may be inserted into the preamble, allowing a position of the synchronization sequence being between the two portions of the signal. In addition, this concept may be compatible with or at least supported by the EPCGlobal Class 1 Gen 2 standards. One of the sequences is represented by 8 bits zeros which is equal to the pilot of the conventional tags. Tags may be operated as a conventional tag and/or as a tag comprising a different preamble.

In the EPCGlobal Class 1 Gen 2 standards, when the slot counter of the conventional tags are zero, they may reply by their RN16 following a constant preamble and switch to a so-called REPLY STATE. If a collision occurred and the collision is resolved, they may receive an ACK command with a valid RN16. Then they may reply with their EPC and go to acknowledged state. If they received an invalid RN16, they forget their RN16 and go to arbitrate state where they wait for a new frame from a query command. Tags described herein may reply by their RN16 and randomly one of the eight different preambles and switch to a reply state when their slot counter is zero. If a collision occurred and the collision is resolved, after this they receive an ACK command with a valid RN16, they may reply with their EPC and go to acknowledged state. If they receive an invalid RN16, they may go to a so-called wait state. In this wait state, the tags described herein may memorize their RN16's values until column a) receiving a command different from an ACK command and/or b) a timeout occurs, where this timeout is restarted by receiving each ACK command with invalid RN16. When one of the these two cases happened, the tag may forget its RN16 and go to arbitrate state waiting for the start of the next frame.

A reader according to the teachings disclosed herein may apply to the normal frame slotted allure (FSA) based on the convectional UHF EPCGlobal Class 1 Gen 2 standards. This may refer to the fact that it is configured to contact normally with the conventional tags. However, a reader may be configured for sending a switch command to switch tags according to the teachings disclosed herein to the enhanced operation mode. The switch command may be transmitted before the query command. The conventional tags will consider the switch command as an invalid command and ignore it. In case of collision, the reader may have the capability of converting this collided slot into pseudo parallel successful slots, i.e., to handle more than one signal received during a slot. This may be achieved by 1. Counting the number of single reply orthogonal pilots, e.g., in a reply counter.
2. Extracting each RN16 corresponding to each pilot.
3. Recognizing if one of these replies comprises a conventional pilot (zeros) or not. If yes, this might be a conventional tag.
4. Checking if one of the tag replies is from a conventional tag. The reader may acknowledge this conventional tag first. If not, the reader may acknowledge the weakest tag reply first.
5. Sending successive ACK commands until finishing the recognized RN16's.

When compared to the UHF EPCGlobal Class 1 Gen 2 standard, a communications system may comprise some modifications. At a tag side, this may include two operation modes: a conventional, base line operation mode and an enhanced operation mode which may be operated after receiving the switch command. The tag may have the ability to choose randomly one of seven or eight different orthogonal pilots. The tags may be able to switch into a wait state into which the tag may enter when a ACK command with an invalid RN16 is received. The tag may keep the value of the RN16 and wait for a valid ACK to enter the acknowledged state. The tags may go to arbitrate state when the waiting time proceeds the timeout or receive any command except the ACK command. A reader may be configured for sending the switch command, for counting the number of single replies from each different pilot and for extracting each RN16 corresponding to each pilot based on channel estimation using the orthogonal pilots. The reader may have the capability of recognizing if one of these replies is the conventional pilot or not. The reader may check if one of the tag replies was sent from a conventional tag. The reader may acknowledge a conventional tag first. If not, the reader may acknowledge the weakest tag reply. The reader may send successive ACK commands until finishing the recognized RN16's.

This may allow for increasing the reading efficiency when compared to the communication system defined in EPC-Global Class 1 Gen 2 standard. The reading efficiency may be increased significantly up to ten times.

Algorithms for tag estimation may become more accurate as the orthogonality of the pilots may give the reader more information about the number of collided tags per collided slot.

Tags and/or readers may be compatible with the EPC-Global Class 1 Gen 2 standards as the tags may be inserted with conventional tags and identified by the conventional readers without effecting the performance and/or as conventional tags can also be inserted with the tags according to the teachings disclosed herein and could be identified by the readers without effecting the performance.

Embodiments of the teachings disclosed herein may be used in RFID applications. For example, such applications may follow the EPCGlobal Class 1 Gen 2 standards. Embodiments may provide a high efficiency, especially when a high or a dense number of tags is present. The high efficiency may allow for a short time during which a high amount of tags or even all tags are identified by a reader. Time may be a very critical issue in the identification process.

Figure 9:
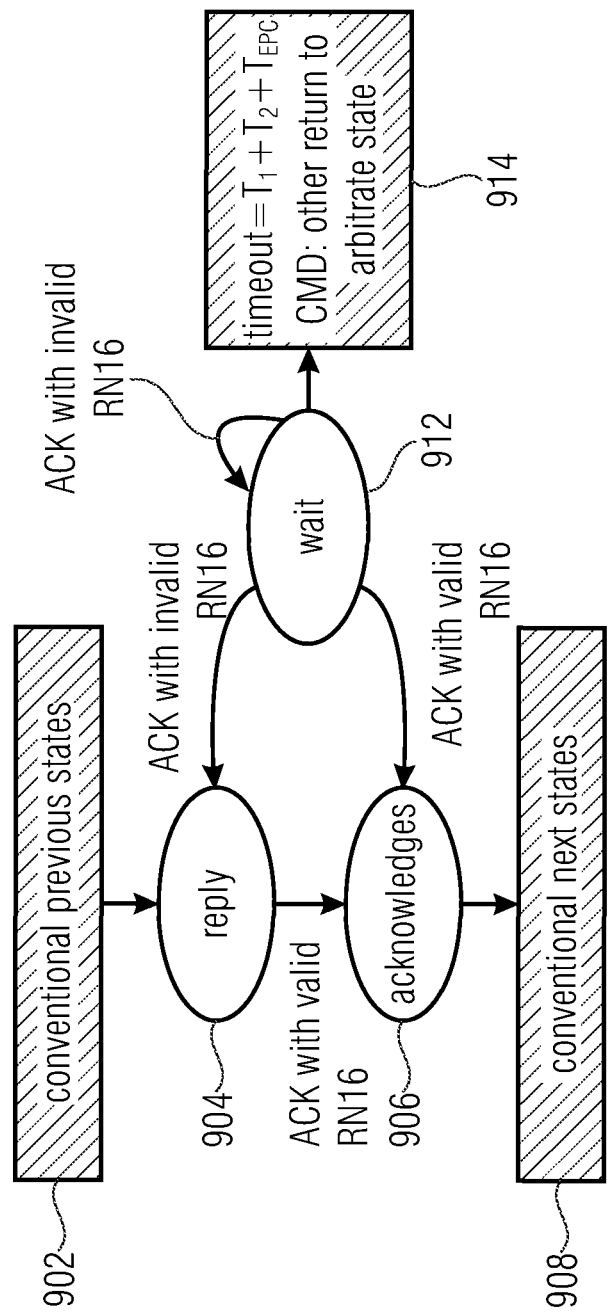
FIG. 9 schematically illustrates a transition between states of operation of a tag according to an embodiment.

FIG. 9 schematically illustrates a transition between states of a tag according to the teachings disclosed herein. In a state 902 the tag may be in any conventional state known in EPCGlobal Class 1 Gen 2 standard. For example, this may be the ready state 612. Based on a reception of the query command the tag may switch in to a reply state 904. When receiving an acknowledge with a valid RN16 an acknowledge state 906 may be entered. From the acknowledged state 906 any other conventional state 908 may be entered. When being in the reply state 904 and receiving an acknowledge with invalid RN16, the tag may enter the wait state 912. The tag may transit from the wait state 912 to the acknowledged state 906 when receiving an acknowledge with a valid RN16, such as a successive acknowledge with the corresponding value. The tag may enter an arbitrate state 914 from the wait state 912 when a timeout occurs or a command different from an acknowledge is received.

Figure 10:
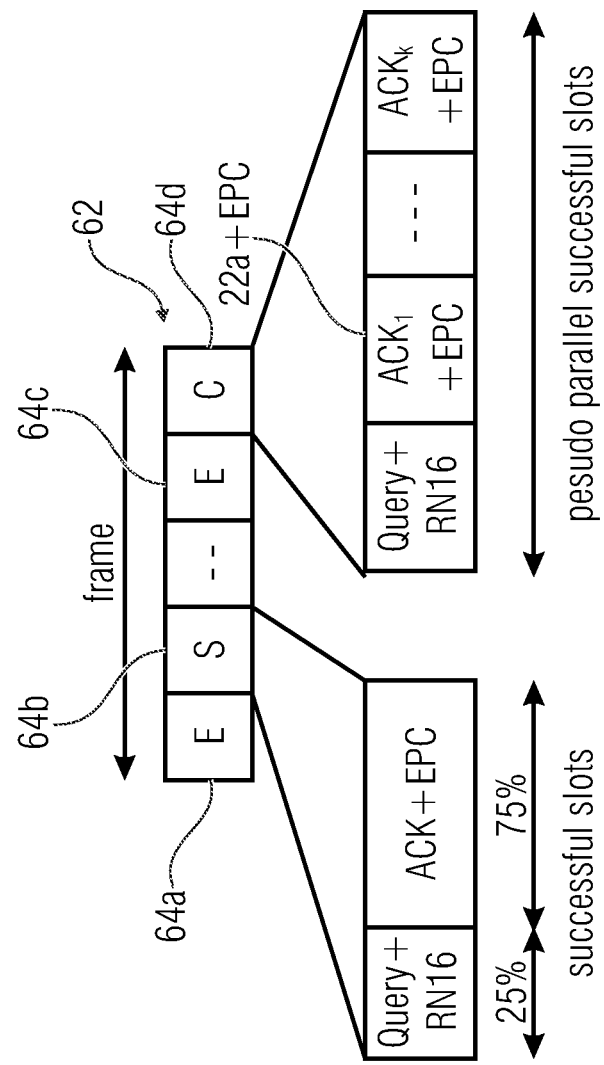
FIG. 10 schematically illustrates an exemplary frame defined by the reader comprising a plurality of slots, according to an embodiment.

FIG. 10 schematically illustrates an exemplary frame 62 defined by a reader. The frame 62 may comprise a plurality of slots 64a-d. A first slot 64a may be empty as indicated by E, i.e., no message or signal is sent by a tag. During a slot 64b, one signal is received by the reader, i.e., the slot 64b is a successful slot as indicated by S. A slot 64c is an empty slot. During a slot 64d, a plurality of signals is received, i.e., collision occurs as indicated by C. A first signal 22a centered by the reader may be an acknowledge message, for example, sent to a tag operating in the base line operation mode such that the tag acknowledged sends its EPC. Afterwards, other tags may be acknowledged and their EPC may be received by the reader. Sequentially transmitted acknowledgments described for the slot 64d may be a plurality of messages such that the slot 64d may be referred to as a pseudo parallel successful slot.

Figure 11:
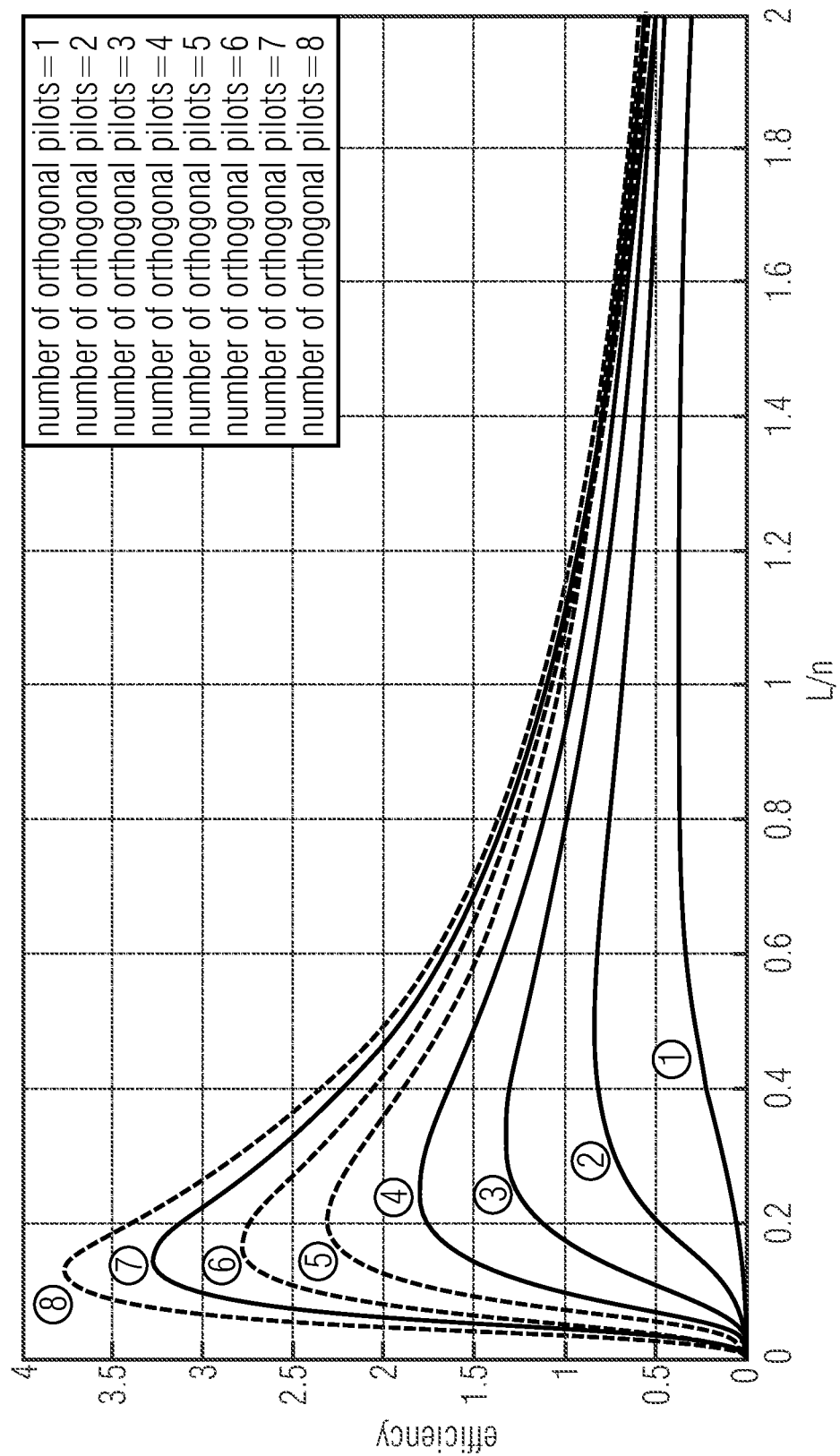
FIG. 11 schematically illustrates a diagram relating a number of sequences with respect to a relationship between a length of a message relative to a number of tags, according to an embodiment.

FIG. 11 schematically illustrates a diagram relating a number of orthogonal pilots (sequences 46a-h) with respect to a relationship between a length of a message L relative to a number of tags n and an efficiency of the communications system that may be obtained when using the sequences 46a-h. By increasing a number of different sequences that may be referred to as orthogonal with respect to each other, an efficiency of the communication system may increase, especially in a range where UN comprises a value of at most 1.2.

FIG. 12 schematically illustrates a concept of determining or calculating the transmission characteristic between a plurality of tags indicated as $x_{1-R}$ and a number of N receiving antennas $r_{1-N}$ of the reader. Between each of the tags $x_{1-R}$ and each of the antennas $r_{1-N}$ a channel $h_{11-NR}$ may be estimated, the plurality of channels $h_{11-NR}$ forming the matrix H. Each signal may be superimposed by a noise $n_{1-R}$.

The reader may be configured for calculating the values of the channel matrix H for R colliding tags, wherein, for example, R is smaller than or equal to N. For example, the processor of the reader may be configured for multiplying signals of the tags received at different antennas $r_{1-N}$ with the sequence contained in the signal of the tag. The reader may estimate one of the columns of the matrix h based on the results. Afterwards, the reader may multiply the other signals and the other sequences contained therein to obtain the other columns or values of the matrix.

Figure 13:
FIG. 13 schematically illustrates a possible structure of an operation signal, according to an embodiment.
Figure 14:
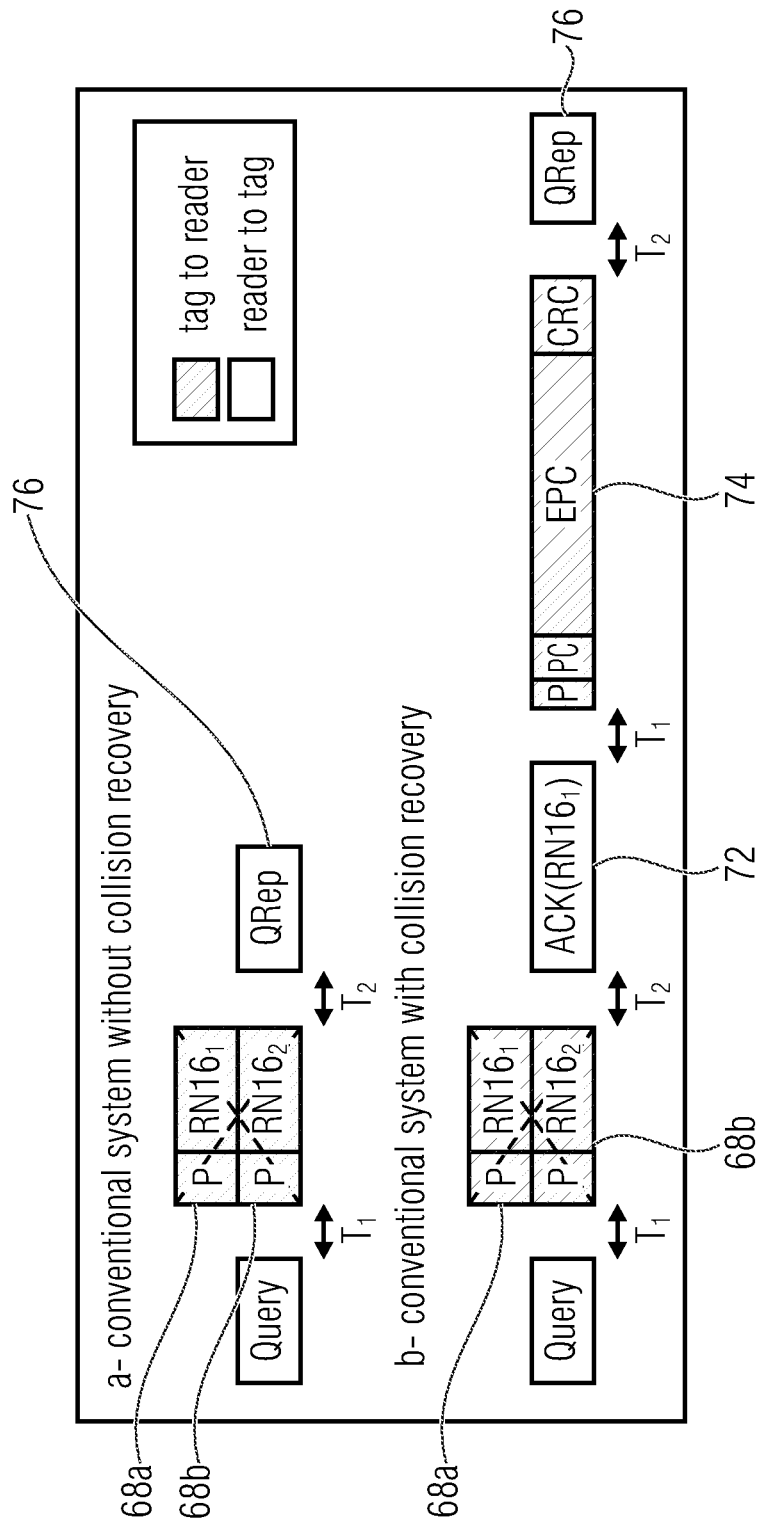
FIG. 14 schematically illustrates different scenarios according to the known technology.

FIG. 13 schematically illustrates a possible structure of an operation signal (switch command) 66. The signal 66 may be transmitted by a reader as described with respect to FIG. 6. The operation signal 66 may comprise any structure, for example, a length of 16 bits, and may be one of the commands reserved for further use in the EPCGlobal Class 1 Gen 2 standards. In the EPCGlobal Class 1 Gen 2 standards, a value room from 1110001000000000 to 1110111111111111 may be available. For example, the signal 66 may comprise a structure according to 1110001000000000.

In the following, some detailed explanations are given with respect to the performance of the teachings disclosed herein.

Based on the new system, we propose a new reading efficiency formula taking into consideration the advantages of the new system:

$$\eta_{new} = \sum_{R=1}^{M} P_R \cdot \left( \sum_{l=1}^{R} P_{S_l}(R) \cdot \beta \right),$$

where:

$P_R$ is the probability that exact R tags are active in one slot. It can be presented as:

$$P_R = \binom{n}{i}\left(\frac{1}{L}\right)^i \left(1 - \frac{1}{L}\right)^{n-i}$$

M presents the maximum number of tags can be resolved (in the proposed case, M is equal to the number of orthogonal codes i.e. M=8).

In the proposed efficiency, we assume the worst case, which is the proposed reader is able to resolve the collided tags which has only unique orthogonal pilot (i.e.: if more than one tag has the same pilot, the reader will not be able to resolve this collision). Since colliding tags have randomly distributed pilots, several collision scenarios are possible[7]. It can happen that all tags involved in a collision have different, unique orthogonal pilot (1+1+ . . . +1), in that case, we can estimate the channel for all collided tags. However, this scenario is more rare. So $P_{S_l}(R)$ presents the probability that scenario $S_l$ has happened. It can be calculated from the binomial distribution as explained in [8]:

$$P_{S_l}(R) = \frac{\prod_{d=1}^{D}\binom{R - \sum_{k}^{d-1} R_k^{cc}}{R_d^{cc}} C!}{C^R \cdot (C - (D+U))!} \prod_{e=2}^{R} \frac{1}{S(e)!}$$

where C is the number of orthogonal pilots in a set (e.g., C=8), D denotes the number of colliding pilots, and $R_d^{CC}$ represents the number of tags with the same pilot for d=1, . . . , D. Moreover, U is the number of unique pilot. The values of D, U and $R_d^{CC}$ for d=1, . . . , D are determined based on the corresponding scenario $S_l$ (l=1, 2, . . . , S(R)). S(e) is calculated as:

$$S(e) = \sum_{d=1}^{D} 1(R_d^{cc} = e),$$

where, e=1, 2, . . . , R. denotes the number of tags with the same pilot, and finally 1(x) is an indicator function: 1(x)=1 if x is true, and zero otherwise. In the proposed case, we have limited number of scenarios so all values of $P_{s_l}(R)$ can be expressed in the following table 1.

β is the Pseudo parallel factor $$\beta = \left( \frac{R_{S_l}^{sol}(R)}{0.25 + 0.75 \cdot R_{S_l}^{sol}(R)} \right),$$

where $R_{S_l}^{sol}(R)$ is the number of tags that can be resolved in scenario $S_l$.

For compatibility only one tag may be acknowledged in parallel, i.e., at the same time. However, a pseudo parallel successful slot may be used. The reader sends a Query command in parallel to all the tags, then receives the RN16's in parallel. Then, the reader may send ACK command successively to the resolved tags. According to EPCGlobal Class 1 gen 2 standards [1], the time of (Query command+ receiving the RN16's)=0.25 from the successful slot time, and the time of (ACK command+receiving the EPC's)=0.75 from the successful slot time, as shown in FIG. 10. So in the proposed concept an efficiency may be obtained multiplied by the Pseudo parallel factor β.

FIG. 11 shows the behavior of the proposed reading efficiency with different number of orthogonal pilots versus the ratio between the frame length and the number of tags in the reading area L/n. According to FIG. 11, if the number of orthogonal pilots is equal to 1, we go to the conventional case where the maximum efficiency is 36% at L/n=1. The proposed system supports 8 orthogonal pilots, which gives 376.7% almost 10 times the conventional case at L/n=0.125.

TABLE 1

| Scenarios | R = 1 | R = 2 | R = 3 | R = 4 | R = 5 | R = 6 | R = 7 | R = 8 |
|---|---|---|---|---|---|---|---|---|
| Unique | $P_{s_1}$ = 1 | $P_{s_1}$ = 0.875 | $P_{s_1}$ = 0.656 | $P_{s_1}$ = 0.41 | $P_{s_1}$ = 0.205 | $P_{s_1}$ = 0.077 | $P_{s_1}$ = 0.019 | $P_{s_1}$ = 0.002 |
| Mixed Scenario | 1 | 1 + 1 | 1 + 1 + 1 | 1 + 1 + 1 + 1 | 1 + 1 + 1 + 1 + 1 | 1 + 1 + 1 + 1 + 1 + 1 | 1 + 1 + 1 + 1 + 1 + 1 | 1 + 1 + 1 + 1 + 1 + 1 + 1 + 1 |
| | | $P_{s_2}$ = 0.125 | $P_{s_2}$ = 0.328 | $P_{s_2}$ = 0.402 | $P_{s_2}$ = 0.513 | $P_{s_2}$ = 0.385 | $P_{s_2}$ = 0.202 | $P_{s_2}$ = 0.067 |
| | | 2 | 2 + 1 | 2 + 1 + 1 | 2 + 1 + 1 + 1 | 2 + 1 + 1 + 1 + 1 | 2 + 1 + 1 + 1 + 1 + 1 | 2 + 1 + 1 + 1 + 1 + 1 + 1 |
| | | | $P_{s_3}$ = 0.016 | $P_{s_3}$ = 0.041 | $P_{s_3}$ = 0.154 | $P_{s_3}$ = 0.288 | $P_{s_3}$ = 0.337 | $P_{s_3}$ = 0.252 |
| | | | 3 | 2 + 2 | 2 + 2 + 1 | 2 + 2 + 1 + 1 | 2 + 2 + 1 + 1 + 1 | 2 + 2 + 1 + 1 + 1 + 1 |
| | | | | $P_{s_4}$ = 0.055 | $P_{s_4}$ = 0.103 | $P_{s_4}$ = 0.019 | $P_{s_4}$ = 0.084 | $P_{s_4}$ = 0.168 |
| | | | | 3 + 1 | 3 + 1 + 1 | 2 + 2 + 2 | 2 + 2 + 2 + 1 | 2 + 2 + 2 + 1 + 1 |
| | | | | $P_{s_5}$ = 0.002 | $P_{s_5}$ = 0.017 | $P_{s_5}$ = 0.128 | $P_{s_5}$ = 0.112 | $P_{s_5}$ = 0.011 |
| | | | | 4 | 3 + 2 | 3 + 1 + 1 + 1 | 3 + 1 + 1 + 1 + 1 | 2 + 2 + 2 + 1 + 1 |
| | | | | | $P_{s_6}$ = 0.009 | $P_{s_6}$ = 0.077 | $P_{s_6}$ = 0.168 | $P_{s_6}$ = 0.067 |
| | | | | | 4 + 1 | 3 + 2 + 1 | 3 + 2 + 1 + 1 | 3 + 1 + 1 + 1 + 1 + 1 |
| | | | | | $P_{s_7}$ = 2 · $10^{-4}$ | $P_{s_7}$ = 0.002 | $P_{s_7}$ = 0.017 | $P_{s_7}$ = 0.224 |
| | | | | | 5 | 3 + 3 | 3 + 2 + 2 | 3 + 2 + 1 + 1 + 1 |
| | | | | | | $P_{s_8}$ = 0.019 | $P_{s_8}$ = 0.112 | $P_{s_8}$ = 0.084 |
| | | | | | | 4 + 2 | 4 + 1 + 1 + 1 | 3 + 3 + 1 + 1 |

TABLE 1-continued

| Scenarios | R = 1 | R = 2 | R = 3 | R = 4 | R = 5 | R = 6 | R = 7 | R = 8 |
|---|---|---|---|---|---|---|---|---|
| | | | | | | $P_{s_9} = 0.003$ <br> $4 + 2$ | $P_{s_9} = 0.028$ <br> $4 + 1 + 1 + 1$ | $P_{s_9} = 0.028$ <br> $3 + 3 + 1 + 1$ |
| | | | | | | $P_{s_{10}} = 0.001$ <br> $5 + 1$ | $P_{s_{10}} = 0.017$ <br> $4 + 2 + 1$ | $P_{s_{10}} = 0.006$ <br> $3 + 3 + 2$ |
| | | | | | | $P_{s_{11}} = 3 \cdot 10^{-5}$ <br> $6$ | $P_{s_{11}} = 0.001$ <br> $4 + 3$ | $P_{s_{11}} = 0.028$ <br> $4 + 1 + 1 + 1 + 1$ |
| | | | | | | | $P_{s_{12}} = 0.003$ <br> $5 + 1 + 1$ | $P_{s_{12}} = 0.042$ <br> $4 + 2 + 1 + 1$ |
| | | | | | | | $P_{s_{13}} = 0.003$ <br> $5 + 2$ | $P_{s_{13}} = 0.004$ <br> $4 + 2 + 2$ |
| | | | | | | | $P_{s_{14}} = 2 \cdot 10^{-4}$ <br> $6 + 1$ | $P_{s_{14}} = 0.006$ <br> $4 + 3 + 1$ |
| | | | | | | | $P_{s_{15}} = 4 \cdot 10^{-6}$ <br> $7$ | $P_{s_{15}} = 1 \cdot 10^{-4}$ <br> $4 + 4$ |
| | | | | | | | | $P_{s_{16}} = 0.006$ <br> $5 + 1 + 1 + 1$ |
| | | | | | | | | $P_{s_{17}} = 0.003$ <br> $5 + 2 + 1$ |
| | | | | | | | | $P_{s_{18}} = 2 \cdot 10^{-4}$ <br> $5 + 3$ |
| | | | | | | | | $P_{s_{19}} = 6 \cdot 10^{-4}$ <br> $6 + 1 + 1$ |
| | | | | | | | | $P_{s_{20}} = 9 \cdot 10^{-5}$ <br> $6 + 2$ |
| | | | | | | | | $P_{s_{21}} = 3 \cdot 10^{-5}$ <br> $7 + 1$ |
| | | | | | | | | $P_{s_{22}} = 5 \cdot 10^{-7}$ <br> $8$ |

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, a tag, a reader or a programmable logic device, configured to or adapted to perform one of the methods described herein.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Literature

[1] "EPC radio-frequency protocols class-1 generation-2 UHF RFID protocol for communications at 860 MHz 960 MHz version 1.1.0 2006."

[2] D. P. R. A. B. L. D. Shen, G. Woo and J. Wang, "Separation of multiple passive rfid signals using software defined radio," IEEE International Conference RFID, 2009.

[3] C. Angerer, R. Langwieser, and M. Rupp, "Rfid reader receivers for physical layer collision recovery," Communications, IEEE Transactions on, vol. 58, pp. 3526-3537, December 2010.

[4] J. Kaitovic, R. Langwieser, and M. Rupp, "Rfid reader with multi antenna physical layer collision recovery receivers," in RFID-Technologies and Applications (RFID-TA), 2011 IEEE International Conference on, pp. 286-291, September 2011.

[5] L. C. V. L. D. De Donno, L. Tarricone and M. M. Tentzeris, "Performance enhancement of the rfid epc gen2 protocol by exploiting collision recovery," Progress In Electromagnetics Research B, vol. 43, 53-72, 2012.

[6] J. Kaitovic, M. Simko, R. Langwieser, and M. Rupp, "Channel estimation in tag collision scenarios," in RFID (RFID), 2012 IEEE International Conference on, pp. 74-80, April 2012.

[7] J. Kaitovic, R. Langwieser, and M. Rupp, "A smart collision recovery receiver for rfids," EURASIP Journal on Embedded Systems, vol. 2013, no. 1, 2013.

The invention claimed is:

1. A reader for wirelessly receiving a signal from a tag, the signal comprising a portion on a first side, a portion on a second side and a synchronization sequence to be detected between the first and the second side, wherein the portion on the first side, the synchronization sequence and the portion on the second side are serially arranged to each other, the reader comprising:
a processor configured
for storing the received signal;
for detecting the synchronization sequence in the received signal;
for calculating a transmission characteristic between the tag and the reader, using the portion of the received signal on the first side; and
for extracting a payload information from the portion of the received signal on the second side, using the calculated transmission characteristic.

2. The reader according to claim 1, wherein the received signal is colliding with at least a further signal sent from a further tag such that a superimposed signal is received from the reader, wherein the processor is configured for separating the signal from the further signal based on a plurality of sets of symbols comprised in the received signal or the further signal.

3. The reader according to claim 2, wherein the processor is configured for calculating the transmission characteristic between each of the tags and the reader and for extracting the payload information from the portion of the signal and of the further signal on the second side, using the calculated transmission characteristic, wherein the processor is configured for determining an operation mode of each of the tags based on the portion on the first side of the signal and the of the further signal and to determine an order of response signals to be transmitted to the tag and to the further tag based on the determined operation mode.

4. The reader according to claim 3, wherein the processor is configured for receiving the signal from a tag operating in a first operation mode and for receiving a further signal from a further tag operating in a second operation mode, wherein the signal and the further signal comprise the same length.

5. The reader according to claim 1, wherein the processor is configured for calculating the transmission characteristic based on a transmission information comprised in a preamble of an expected signal comprising the portion on the first side and the synchronization sequence.

6. The reader according to claim 1, wherein the processor is configured for comparing the received signal with a predetermined information to acquire a result of the comparison and for detecting a position of the synchronization sequence in the signal based on the result, wherein at least a first bit is arranged between the synchronization sequence and a beginning of the received signal, wherein the processor is configured for calculating the transmission characteristic using the at least one bit.

7. The reader according to claim 1, wherein the processor is configured for sending an operation signal indicating that a tag receiving the operation signal is requested to comprise a modified transmission information into the signal, the modified transmission information being one of a multitude of different sets of information, wherein at least one modified transmission information of the sets of information is different from a predetermined transmission information.

8. The reader according to claim 1, wherein the tag is a first tag and wherein the signal is a first signal, wherein the first signal is superimposed by a second signal received from a second tag, wherein the processor is configured for separating the first signal and the second signal and wherein the processor is configured for generating a first response signal comprising an information derived from the payload information of the first signal and a second response signal comprising an information derived from the payload information of the second signal, wherein the reader is configured for transmitting the first and the second response signals sequentially.

9. The reader according to claim 8, wherein the processor is configured for determining a first measure related to a signal power of the first signal and a second measure related to a signal power of the second signal, for comparing the first measure and the second measure to determine which of the first and second measure is related to a lower signal power when compared to the other measure and for sending the response signal comprising the information derived from the payload information of the signal related to the lower signal power before the other response signal.

10. A tag for wirelessly sending a signal to a reader, the tag comprising
a processor configured for generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other;
wherein the processor is configured for selecting a modified transmission information from a plurality of modified transmission information and to comprise the selected modified transmission information into the portion on the first side.

11. The tag according to claim 10, wherein the processor is configured for arranging the modified transmission information adjacent to the synchronization sequence in the portion on the first side and for arranging a portion comprising a predetermined structure between the first side and the modified transmission information.

12. The tag according to claim 10, wherein the tag is configured for receiving an operation signal from the reader, wherein the processor is configured to comprise a predetermined transmission information into the portion on the first side of a previous signal before receiving the operation signal and to comprise the modified transmission information into the portion on the first side of a latter signal after receiving the operation signal.

13. The tag according to claim 10, wherein the processor is configured for generating and storing a temporary variable and to comprise the temporary variable as a payload information into a signal to be sent to the reader and to keep the temporary variable stored if a signal received from the reader comprises a payload information different from the temporary variable or an information derived thereof, the signal expected by the processor to comprise the temporary variable or the information derived thereof.

14. A method for wirelessly receiving a signal with a reader from a tag, the signal comprising a portion on a first side, a portion on a second side and a synchronization sequence to be detected between the first and the second side, wherein the portion on the first side, the synchronization sequence and the portion on the second side are serially arranged to each other, the method comprising:
   storing the received signal;
   detecting the synchronization sequence in the received signal;
   calculating a transmission characteristic between the tag and the reader, using the portion of the received signal on the first side; and
   extracting a payload information from the portion of the received signal on the second side, using the calculated transmission characteristic.

15. A method for wirelessly sending a signal to a reader, the method comprising
   generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other; and
   selecting a modified transmission information from a plurality of modified transmission information and to comprise the selected modified transmission information into the portion on the first side.

16. A non-transitory digital storage medium having stored thereon a computer program for performing the method for wirelessly receiving a signal with a reader from a tag, the signal comprising a portion on a first side, a portion on a second side and a synchronization sequence to be detected between the first and the second side, wherein the portion on the first side, the synchronization sequence and the portion on the second side are serially arranged to each other, the method comprising:
   storing the received signal;
   detecting the synchronization sequence in the received signal;
   calculating a transmission characteristic between the tag and the reader, using the portion of the received signal on the first side; and
   extracting a payload information from the portion of the received signal on the second side, using the calculated transmission characteristic,
   when said computer program is run by a computer.

17. A non-transitory digital storage medium having stored thereon a computer program for performing the method for wirelessly sending a signal to a reader, the method comprising
   generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other, and
   selecting a modified transmission information from a plurality of modified transmission information and to comprise the selected modified transmission information into the portion on the first side;
   when said computer program is run by a computer.

18. A tag for wirelessly sending a signal to a reader, the tag comprising
   a processor configured for generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other;
   wherein the tag is configured for receiving an operation signal from the reader, wherein the processor is configured to comprise a predetermined transmission information into the portion on the first side of a previous signal before receiving the operation signal and to comprise the modified transmission information into the portion on the first side of a latter signal after receiving the operation signal.

19. A tag for wirelessly sending a signal to a reader, the tag comprising
   a processor configured for generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other;
   wherein the processor is configured for generating and storing a temporary variable and to comprise the temporary variable as a payload information into a signal to be sent to the reader and to keep the temporary variable stored if a signal received from the reader comprises a payload information different from the temporary variable or an information derived thereof, the signal expected by the processor to comprise the temporary variable or the information derived thereof.

20. A method for wirelessly sending a signal to a reader, the method comprising
   generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other,
   receiving an operation signal from the reader, and
   comprising a predetermined transmission information into the portion on the first side of a previous signal before receiving the operation signal and comprising the modified transmission information into the portion on the first side of a latter signal after receiving the operation signal.

21. A method for wirelessly sending a signal to a reader, the method comprising
   generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other, and
   generating and storing a temporary variable and comprising the temporary variable as a payload information into a signal to be sent to the reader and keeping the temporary variable stored if a signal received from the reader comprises a payload information different from the temporary variable or an information derived thereof, the signal expected to comprise the temporary variable or the information derived thereof.

22. A non-transitory digital storage medium having stored thereon a computer program for performing the method for wirelessly sending a signal to a reader, the method comprising generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other, receiving an operation signal from the reader, and comprising a predetermined transmission information into the portion on the first side of a previous signal before receiving the operation signal and comprising the modified transmission information into the portion on the first side of a latter signal after receiving the operation signal, when said computer program is run by a computer.

23. A non-transitory digital storage medium having stored thereon a computer program for performing the method for wirelessly sending a signal to a reader, the method comprising generating the signal using a synchronization sequence and by arranging the synchronization sequence between a portion of the signal on a first side of the signal and a portion of the signal at a second side of the signal such that the portion on the first side, the synchronization sequence and the portion on the second side are serially arranged to each other, and generating and storing a temporary variable and comprising the temporary variable as a payload information into a signal to be sent to the reader and keeping the temporary variable stored if a signal received from the reader comprises a payload information different from the temporary variable or an information derived thereof, the signal expected to comprise the temporary variable or the information derived thereof when said computer program is run by a computer.

* * * * *